(12) United States Patent
Matsumoto

(10) Patent No.: US 6,658,936 B2
(45) Date of Patent: Dec. 9, 2003

(54) APPARATUS AND METHOD FOR MEASURING UNIFORMITY AND/OR DYNAMIC BALANCE OF TIRE

(75) Inventor: Sigeru Matsumoto, Tokyo (JP)

(73) Assignee: Kokusai Keisokuki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/091,701

(22) Filed: Mar. 6, 2002

(65) Prior Publication Data

US 2002/0124650 A1 Sep. 12, 2002

(30) Foreign Application Priority Data

| Mar. 8, 2001 | (JP) | ............................ 2001-065812 |
| May 22, 2001 | (JP) | ............................ 2001-153249 |
| May 23, 2001 | (JP) | ............................ 2001-153295 |
| May 23, 2001 | (JP) | ............................ 2001-153329 |
| Jun. 20, 2001 | (JP) | ............................ 2001-187405 |

(51) Int. Cl.⁷ ................................................. G01M 1/16
(52) U.S. Cl. ............................................ 73/460; 73/462
(58) Field of Search .................................... 73/460, 462

(56) References Cited

U.S. PATENT DOCUMENTS 6,131,455 A    10/2000    Matsumoto

FOREIGN PATENT DOCUMENTS

EP    1 030 169 A2    8/2000

*Primary Examiner*—Richard A. Moller
(74) *Attorney, Agent, or Firm*—Pitney, Hardin, Kipp & Szuch LLP

(57) ABSTRACT

There is provided an apparatus for measuring uniformity and dynamic balance of a tire, comprising:

a spindle rotatably supported in a rigidly-supported spindle housing, said tire being fixedly mounted on said spindle, said spindle being rotated when measurement is performed; and at least one piezoelectric force sensor mounted on a surface of said spindle housing, said at least one piezoelectric force sensor detecting a force generated by rotation of the tire as said spindle is rotated.

25 Claims, 20 Drawing Sheets

APPARATUS AND METHOD FOR MEASURING UNIFORMITY AND/OR DYNAMIC BALANCE OF TIRE

BACKGROUND OF THE INVENTION

The present invention relates to method and apparatus of measuring a tire uniformity and/or dynamic balance.

There have been known method and apparatus of measuring a tire uniformity and dynamic balance in order to evaluate whether a tire may cause the vibration and acoustic noise of a motor vehicle on which the tire is mounted. When a uniformity measurement is performed, a tire to be tested is rotated with a rotary drum being press-contacted the circumferential surface thereof when it is rotated, and radial and/or thrust force variations are detected. When a dynamic balance measurement is performed, based on a centrifugal force when the tire is rotated, the eccentricity of the tested tire is detected.

An example of the tire uniformity and dynamic balance measuring apparatus is disclosed in Japanese patent Application Provisional Publication No. HEI 11-183298. In the above-described publication, a tire is mounted on a rotary spindle, which is rotatably supported within a spindle housing using ball bearings, and is rotated at a predetermined rotation speed.

Specifically, when the uniformity measurement is performed, the rotary drum is press-contacted with the circumferential surface tested tire at several hundreds Kgf or more, and the tire is rotated together with the spindle. The force variation can be detected by load cells fixed to the rotary drum. Since the load cells detect force based on the deformation thereof, for detecting the force variation at high accuracy, the rotation axis of the tested tire must be prevented from vibrating during the uniformity measurement.

On the other hand, when the dynamic balance measurement is performed, the tire is rotated without the rotary drum. Then, the centrifugal force generated in the tested tire due to unbalance of the tire is detected using the load cells provided between the spindle housing and a base of the apparatus. It should be noted that, during the dynamic balance measurement, the spindle housing should be allowed to vibrate freely.

Accordingly, the conventional tire uniformity and dynamic balance measuring apparatus must include a lock/unlock mechanism for preventing the vibration of the tested tire during the uniformity measurement and allowing the vibration of the tested tire during the dynamic balance measurement, which requires a relatively complicated system.

Furthermore, in order to perform the measurements for wheeled tires, by the conventional apparatus, hub holes of the wheel should be fixed to cylindrically-shaped protruded potions of the spindle unit. The axis of the protruded portions coincides with the rotational axis of the spindle at high accuracy in order to position the wheeled tire.

However, the system limit of the diameter of the hub hole is typically around 0.2 mm, so the system limit of coaxiality between the rotational axis of the tested tire and the rotational axis of the spindle can be up to 0.1 mm. That is, the rotational axis of the tire can be divided from the rotational axis up to 0.1 mm. It is therefore difficult to the dynamic balance and/or uniformity at high accuracy.

The uniformity measurement is defined by JASO C607 standard. In the standard, the rotational speeds of a tested tire is defined to 60 r.p.m., which corresponds to a vehicles speed of approximately 7 kilometers/hour, which might be insufficient to evaluate the tires. It is desirable to measure a high-speed uniformity of tires for evaluating the behavior thereof when a motor vehicle runs at a higher speed.

In particular, the tractive force variation affects the vibration and acoustic noise of a motor vehicle which is driving at a relatively high speed. It is therefore desirable to detect the tractive force variation in the high-speed uniformity measurement.

Moreover, the above-mentioned conventional measuring apparatus rotates the spindle using a belt driving mechanism which employs an endless belt for the dynamic balance measurement. In order to rotate the spindle at the desired revolution speed at high accuracy, inelastic belt, such as a canvas belt, is preferably used as the endless belt. Such an inelastic belt can, however, transmit most of vibrations, caused by friction between the belt and pulleys to which the belt is wound. The vibration is transmitted to the spindle, which makes it impossible to measure the dynamic balance at high accuracy.

SUMMARY OF THE INVENTION

In view of the above, an advantage achieved by the present invention is to provide a simple-structured apparatus and method of measuring the uniformity and/or the dynamic balance of a tested tire.

A further advantage of the present invention is to provide an apparatus and/or a method capable of positioning the wheeled tire for the spindle of the apparatus with high accuracy.

A furthermore advantage of the present invention is to provide an improved apparatus and method capable of measuring the uniformity suitable for measuring the high-speed uniformity.

In one aspect of the present invention, there is provided an apparatus for measuring uniformity and dynamic balance of a tire, comprising:

a spindle rotatably supported in a rigidly-supported spindle housing, said tire being fixedly mounted on said spindle, said spindle being rotated when measurement is performed; and at least one piezoelectric force sensor mounted on a surface of said spindle housing, said at least one piezoelectric force sensor detecting a force generated by rotation of the tire as said spindle is rotated.

The piezoelectric force sensor can detect the force while deforming little. It is therefore capable of detecting the force generated during the dynamic balance measurement although the spindle housing is rigidly supported.

In the preferable embodiment of present invention, there is provided an apparatus for measuring uniformity and/or dynamic balance of a tire, comprising:

a spindle rotatably mounted in a spindle housing via at least one bearing, the tire being fixedly mounted on said spindle; and at least one radial cylindrical bearing that rotatably supports said spindle in said spindle housing, said radial cylindrical bearing including at least a radial double-row cylindrical bearing.

The radial cylindrical bearing is capable of supporting higher load although the strain of the bearing is lower than a ball bearing. The vibration of the spindle against the spindle housing can be prevented, therefore the force generated in the spindle can be transmitted to the spindle housing with high accuracy.

Preferably, a part of a circumferential surface of said spindle on which said radial cylindrical bearing is to be attached is tapered, an inner surface of said radial cylindrical bearing is tapered such that a cone angle of said inner surface is the same as a cone angle of the tapered part of the circumferential surface of said spindle, and said radial cylindrical bearing is attached to said spindle so that the inner surface of said radial cylindrical bearing tightly fits on said tapered part of the circumferential surface of said spindle.

The inner ring of said radial cylindrical bearing tightly fits to said tapered part of the circumferential surface of said spindle, therefore the vibration of the spindle against the spindle housing can be further prevented.

In the preferable embodiment of present invention, there is provided an apparatus for measuring uniformity and/or dynamic balance of a tire, comprising:

a spindle rotatably mounted in a spindle housing via at least one bearing, the tire being fixedly mounted on said spindle, wherein said spindle holds the tire between a lower rim attached to said spindle and an upper rim which is arranged oppositely with respect to the lower rim, said upper rim is movable upward and downward with respect to said spindle, said upper rim including a lock shaft downwardly extending from a rotation center of said upper rim, said lock shaft being capable of fitting to a fitting portion formed in said spindle.

Preferably, said spindle is rotatably supported in said spindle housing via a plurality of bearings, and wherein the fitting portion of said spindle is located at substantially a midpoint between two of said plurality of bearings.

Such the measuring apparatus described above can supports both of the fitting portion and the lower portion, so the deformation and displacement of the spindle can be prevented by spreading the concentration of bending stress into two parts. The load which the spindle is receiving can be transmitted to the spindle housing with higher accuracy, so the uniformity can be measured with high accuracy.

In the preferable embodiment of present invention there is provided an apparatus for measuring uniformity and/or dynamic balance of a tire, comprising:

a spindle;

a spindle housing rotatably supporting said spindle;

a lower rim attached to said spindle and an upper rim arranged oppositely to said lower rim, said upper rim being movable upward and downward, and rotatable; and a lock member for holding said upper rim at a predetermined position, said apparatus being configured to measure uniformity and/or dynamic balance of the tire, by rotating said spindle with holding the tire using said upper and lower rims, wherein said upper rim includes a lock shaft downwardly extending from the rotation center of said upper rim, the lock shaft being engageable with said spindle, and wherein said lower rim includes:

a lock shaft insertion cylinder in which said lock shaft can be inserted; and a lock member attaching hole formed on the circumferential surface of said lock shaft insertion cylinder, one end of said lock shaft insertion cylinder being fixed to one end of said spindle, said lock member being slidable in said lock member attaching hole in the radial direction of said lower rim, said lock member meshing with locking grooves formed on said lock shaft to lock said lock shaft, and wherein the length of said lock shaft insertion cylinder in the axial direction of said lower rim is 1–2 times as long as the length of said lock member attaching hole in the axial direction of said lower rim.

According to present invention, the distance between a part where the load in the radial direction is enforced (i.e., a part on which the tire is mounted) and a bearing as fulcrum point for the load can be shortened as possible, therefore the bending moment which the spindle is received can be smaller as possible.

Preferably, the length of said lock shaft insertion cylinder in the axial direction of said lower rim is 1–1.5 times as long as the length of said lock member attaching hole in the axial direction of said lower rim.

In the preferred embodiment of the present invention, there is provided an apparatus for measuring uniformity and/or dynamic balance of a wheeled tire mounted on a spindle rotatably supported in a spindle housing, comprising:

a wheel stand formed on one end of said spindle, said wheel stand including a flat surface portion on which the wheel of the tire is mounted; and a top adapter attached to and facing the flat surface portion of said wheel stand, said top adapter including an urging member capable of urging the wheel of the tire toward said flat surface portion, wherein said wheel stand includes a tapered cylinder-shaped protruded portion protruded from the flat surface portion, the protruded portion being inserted in a hub hole of the wheel, the central axis of said protruded portion coinciding with the rotational axis of said spindle, the diameter of said protruded portion being smaller at a portion farther from the flat surface portion, wherein said top adapter includes a collet member having a cylinder portion, the diameter thereof being slightly smaller than the diameter of said hub hole, wherein the inner surface of said collet member includes a tapered surface having a taper angle substantially the same as the taper angle of the circumferential surface of said protruded portion of said wheel stand, the diameter of said collet member being smaller at a portion farther from said flat surface portion, wherein said collet member includes a plurality of slits extending from an end of the collet member facing the flat surface portion of said wheel stand, the slits being substantially in parallel to the central axis of said cylinder portion, and wherein the wheeled tire can be positioned by pressing said collet member toward the flat surface portion of said wheel stand when the inner surface of said collet member contacts the circumferential surface of said protruded portion of said wheel stand, the wheeled tire being positioned when the outer diameter of said cylinder portion is increased and said cylinder member contacts said hub hole.

In the preferred embodiment of the present invention, there is provided an apparatus wherein said piezoelectric force sensor includes a triaxial piezoelectric force sensor.

Preferably, the tire is rotated by a rotary drum of said apparatus during the uniformity measurement.

In the preferred embodiment of the present invention, there is provided an apparatus for measuring uniformity and dynamic balance of a tire, said apparatus comprising:

a rotatable spindle, the tire being fixedly mounted on said spindle; and a rotary drum that is press-contactable to the tire, wherein both of said rotary drum and said spindle are rotatably driven, respectively, said rotary drum being rotatably driven during the uniformity measurement, said spindle being rotatably driven during the dynamic balance measurement, said spindle is rotatably driven by a transmission belt, said transmission belt being wound around a driving pulley and at least one driven pulley, at least one of said driving and driven pulleys being movable to engage/disengage said transmission belt with/from a pulley of said spindle, said spindle is rotatably driven during the dynamic balance measurement when said transmission belt has engaged the pulley of said spindle, and said spindle is rotatably driven during the uniformity measurement when said transmission belt has disengaged from the pulley of said spindle.

Preferably, said apparatus is capable of measuring the dynamic balance immediately after the uniformity has been measured, and said driving pulley is prerotated and the circumferential speed of said driving pulley is set to the circumferential speed of said pulley of said spindle during the uniformity measurement so that the rotational speed of said spindle is unchanged when said transmission belt engages said pulley of said spindle. Preferably, said transmission belt is wound around all of said driving pulley and said driven pulleys. Preferably, the outer surface of said transmission belt engages with the pulley of said spindle during the dynamic balance measurement.

In the preferred embodiment of the present invention, there is provided an apparatus for measuring dynamic balance of a tire, comprising:

a rotatable spindle, the tire being fixedly mounted on said spindle, said spindle being rotatably supported in a rigidly-supported spindle housing, wherein a force generated by the rotation of the tire can be detected by a piezoelectric force sensor mounted on a surface of said spindle housing, the tire and said spindle being rotatably driven by a rotary drum which is press-contacted with the tire at a first pressing force in the predetermined direction which is perpendicular to the rotational axis of said spindle and rotating the tire.

Preferably, said first pressing force is within a range of 20–100 kgf. Preferably, said first pressing force is within a range of 40–60 kgf. Preferably, said piezoelectric force sensor is capable of detecting a force component in a direction perpendicular to both of said predetermined direction and the rotational axis of said spindle.

In the preferred embodiment of the present invention, there is provided a method for measuring dynamic balance of a tire, comprising:

a tire mounting step for mounting the tire on a spindle of a dynamic balance measuring apparatus, the spindle being rotatably attached to a rigidly-supported spindle housing of the apparatus;

a first tire pressing step for pressing the tire in a predetermined direction perpendicular to the rotational axis of the spindle at a second pressing force with a rotary drum of the apparatus;

a rotary drum rotating step for rotatably driving the rotary drum;

a first rotary drum speed changing step for accelerating the rotation of the tire to a first rotational speed;

a second tire pressing step for changing the amount of the load for pressing the tire by the rotary drum into a first pressing force; and a first measurement step for detecting a force generated in the tire in the first measurement step by at least one piezoelectric force sensor fittingly mounted on the spindle housing, wherein the first pressing force is 1–10 times as large as the second pressing force.

Preferably, first pressing force is 2–4 times as large as the second pressing force. Preferably, the first rotational speed is within a range of 60–3300 r.p.m. Preferably, the first rotational speed is within a range of 60–3300 r.p.m. Preferably, the first rotational speed is within a range of 750–1400 r.p.m.

In the preferred embodiment of the present invention, there is provided a method for measuring dynamic balance and uniformity of a tire, comprising:

a tire mounting step for mounting the tire on a spindle of a dynamic balance measuring apparatus, the spindle being rotatably attached to a rigidly-supported spindle housing of the apparatus;

a first tire pressing step for pressing the tire to a second pressing force by a rotary drum of the apparatus, the rotary drum being capable of pressing the tire in the predetermined direction perpendicular to the rotational axis of the spindle and rotating the tire;

a rotary drum rotating step for rotatably driving the rotary drum;

a first rotary drum speed changing step for accelerating the rotation of the tire to a first rotational speed;

a second tire pressing step for changing the amount of the load for pressing the tire by the rotary drum into a first pressing force;

a first measurement step for detecting a force generated in the tire by at least one piezoelectric force sensor mounted on the spindle housing;

a third tire pressing step for changing the amount of the load for pressing the tire by the rotary drum into a third pressing load;

a second rotary drum speed changing step for changing the rotational speed of the tire into a second rotational speed; and a second measurement step for detecting a force generated in the tire by said piezoelectric force sensor.

Preferably, said third pressing load is 100–2000 kgf. Preferably, said second rotational speed is 60 r.p.m.

In the preferred embodiment of the present invention, there is provided an apparatus for measuring uniformity and dynamic balance of a tire, wherein said tire and spindle are rotatably driven by said rotary drum to a first rotational speed during the dynamic balance measurement while being pressed by said rotary drum to a first load in a predetermined direction perpendicular to the rotational axis of said spindle, wherein the tire and said spindle are rotatably driven by said rotary drum to a second rotational speed during the uniformity measurement while being pressed by said rotary drum to a second load in the predetermined direction perpendicular to the rotational axis of said spindle, wherein said first pressing force is smaller than said first pressing force, and wherein said second rotational speed is within a range of 60–3300 r.p.m.

Preferably, said first pressing force is within a range of 20–100 kgf. Preferably, said first pressing force is 40–60 kgf. wherein said second pressing force is within a range of 100–2000 kgf. said first rotational speed is within a range of 750–1400 r.p.m.

BRIEF DESCRIPTION OF THE ACCOMPANYING DRAWINGS

Figure 14:
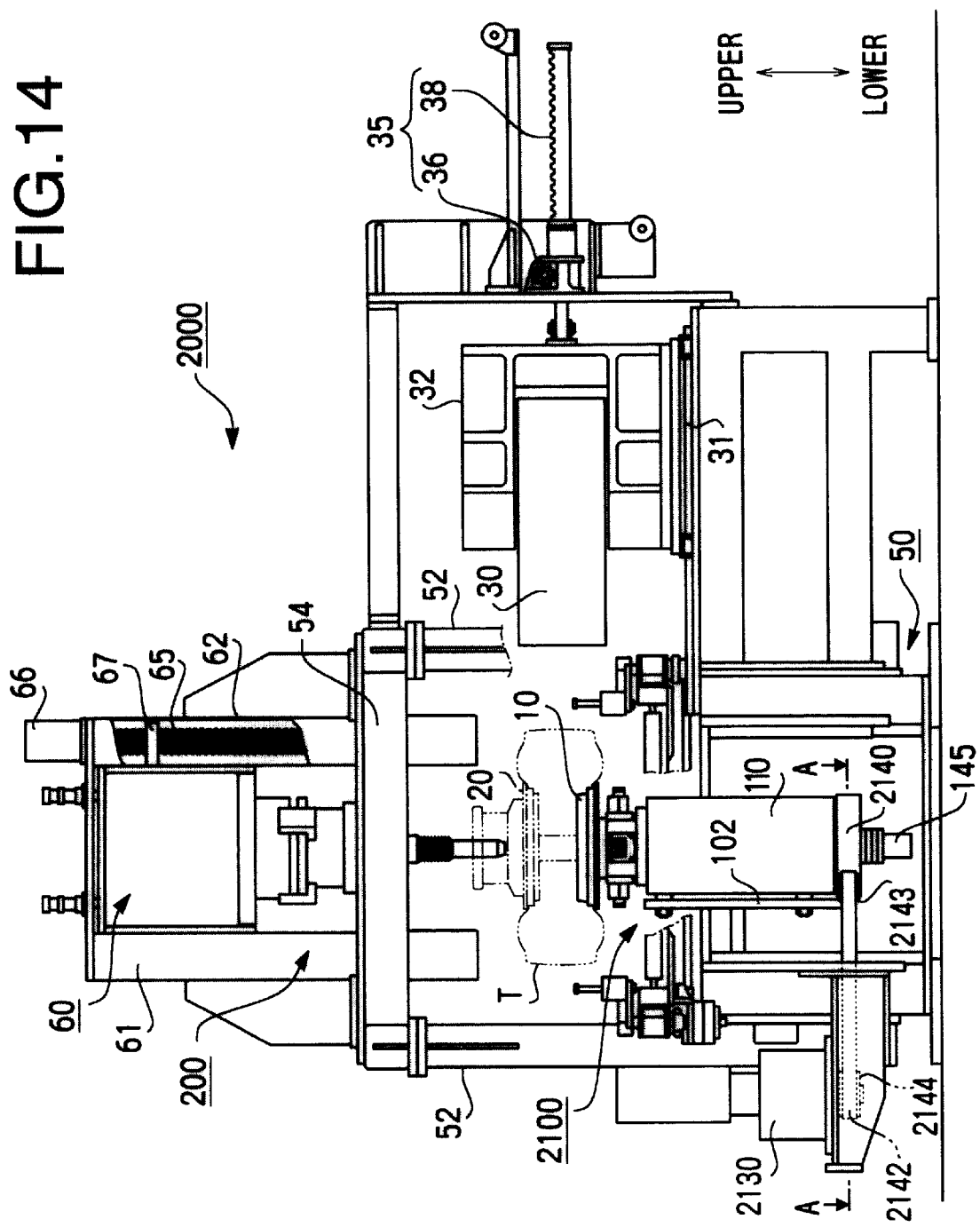
FIG. 14 is a front view of an integrated measuring apparatus of the third embodiment of the invention.
Figure 16:
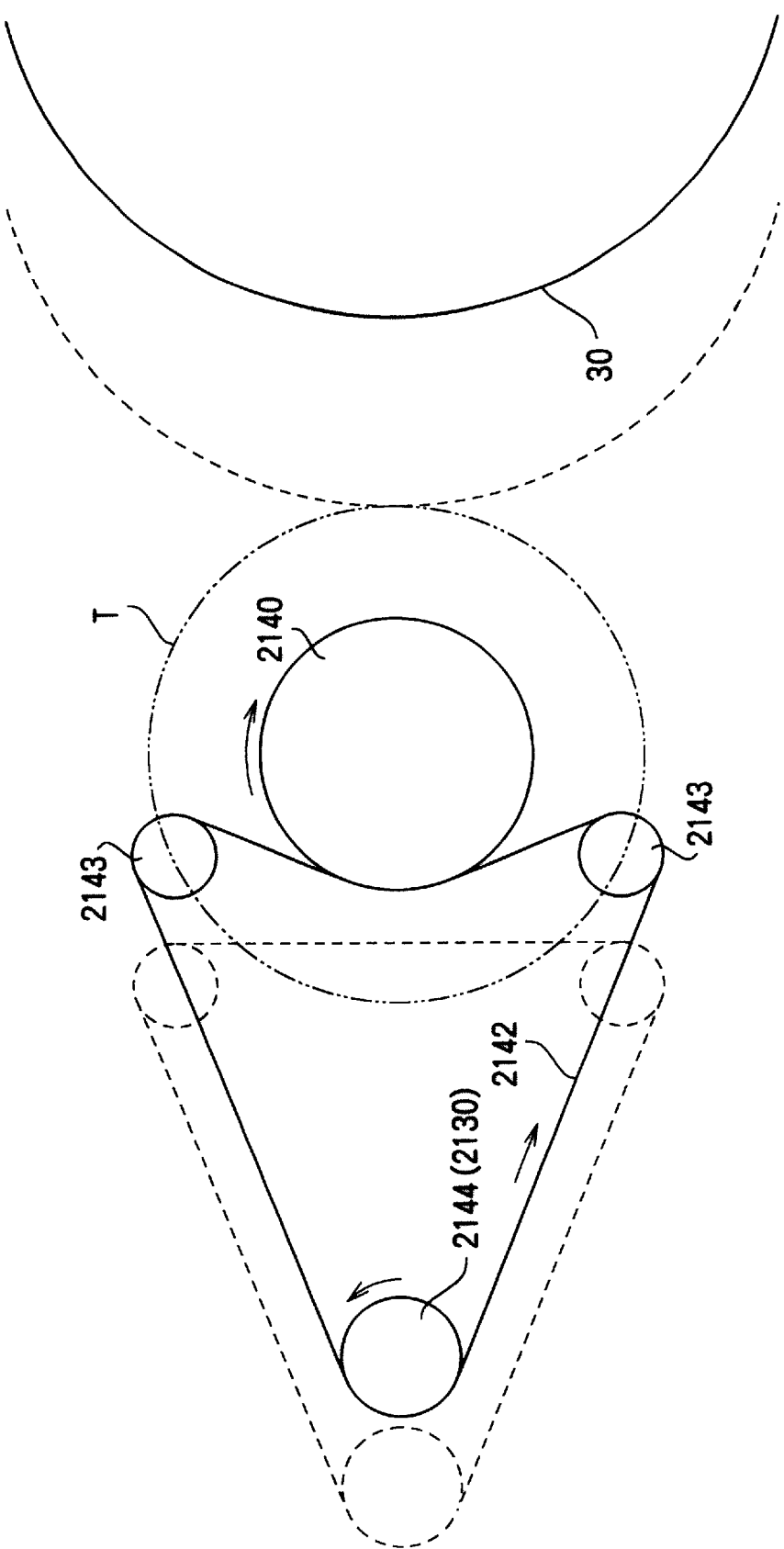
Figure 17:
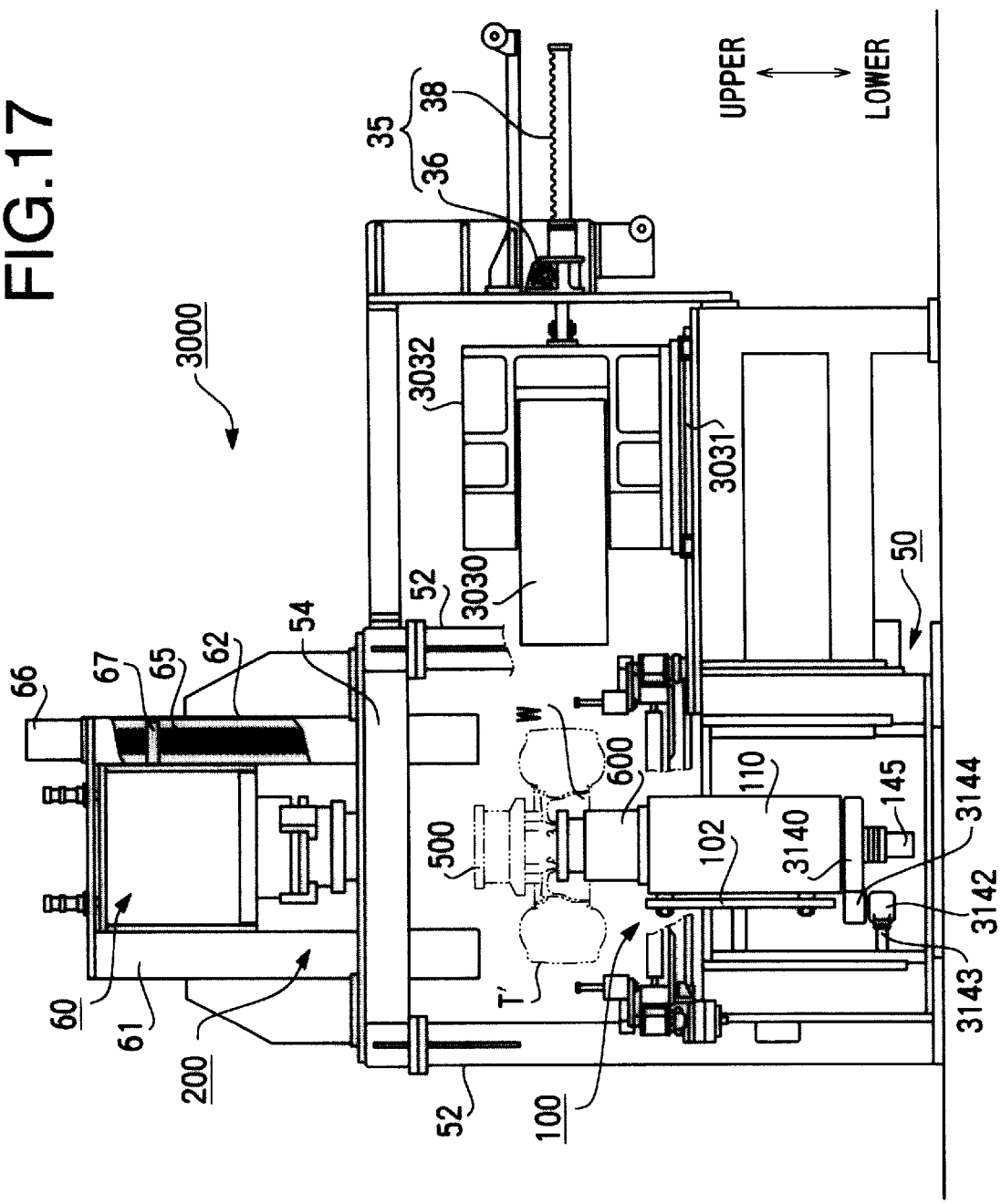
Figure 18:
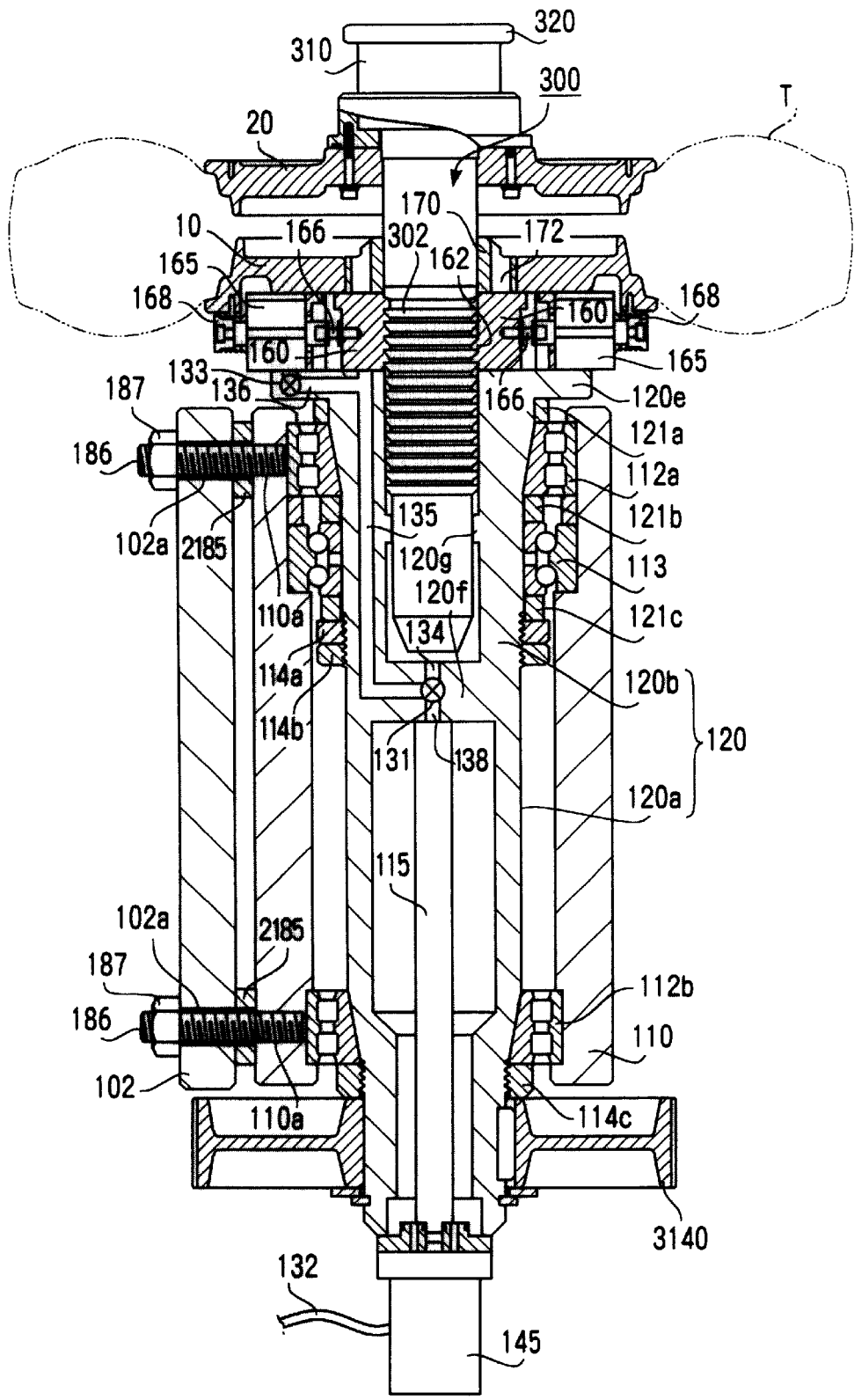
Figure 19:
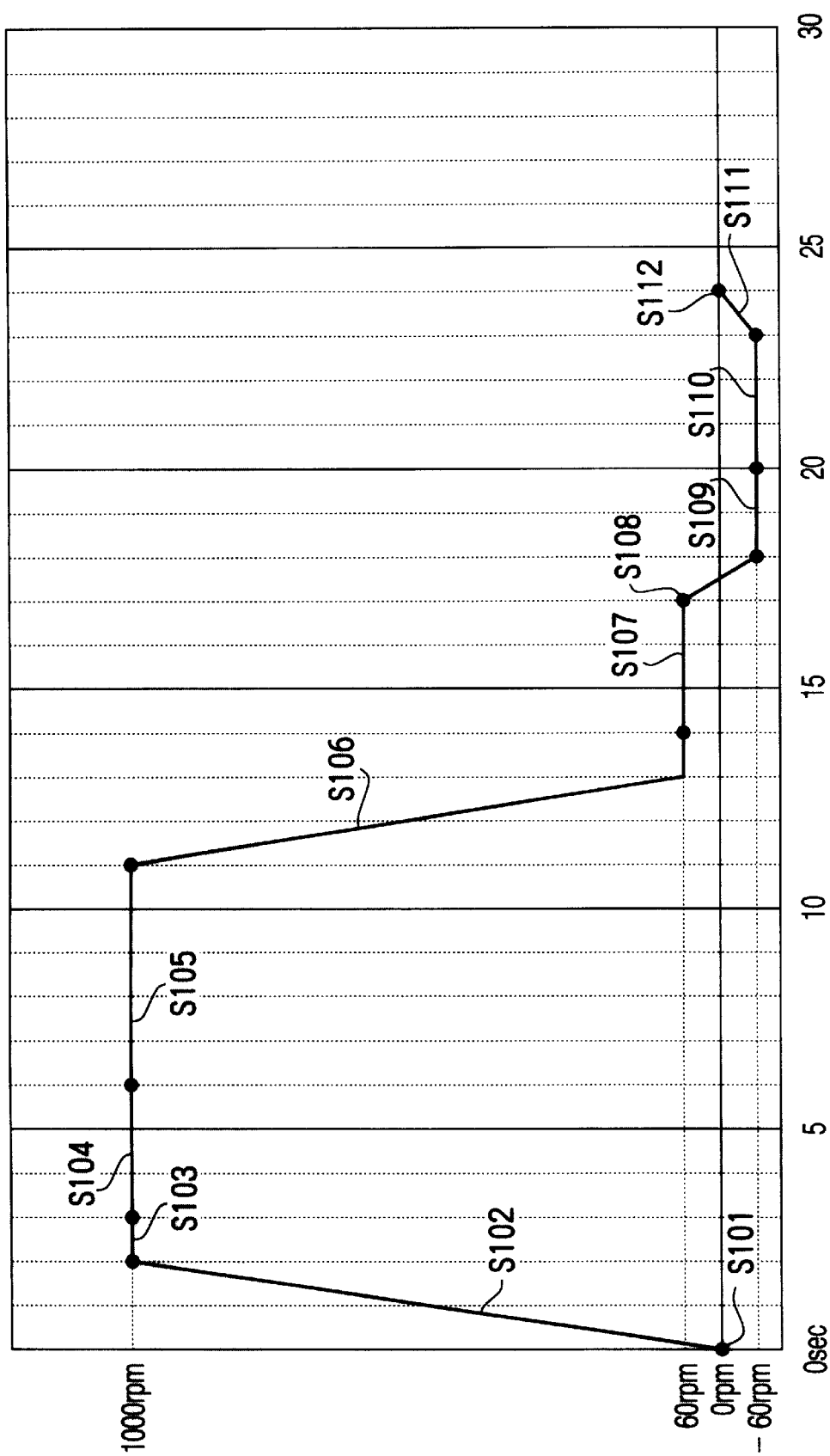
Figure 20:
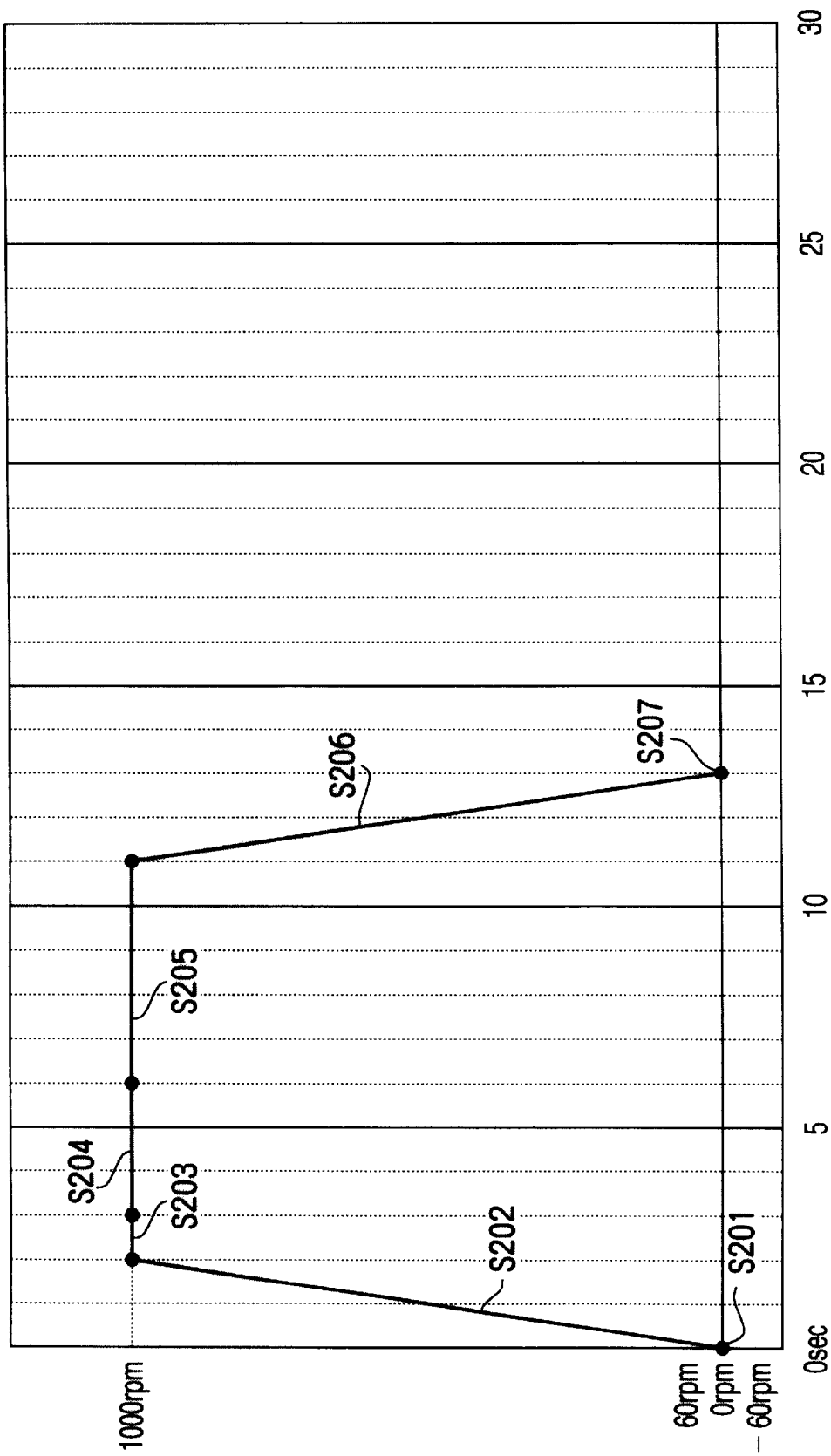
Figure 21:
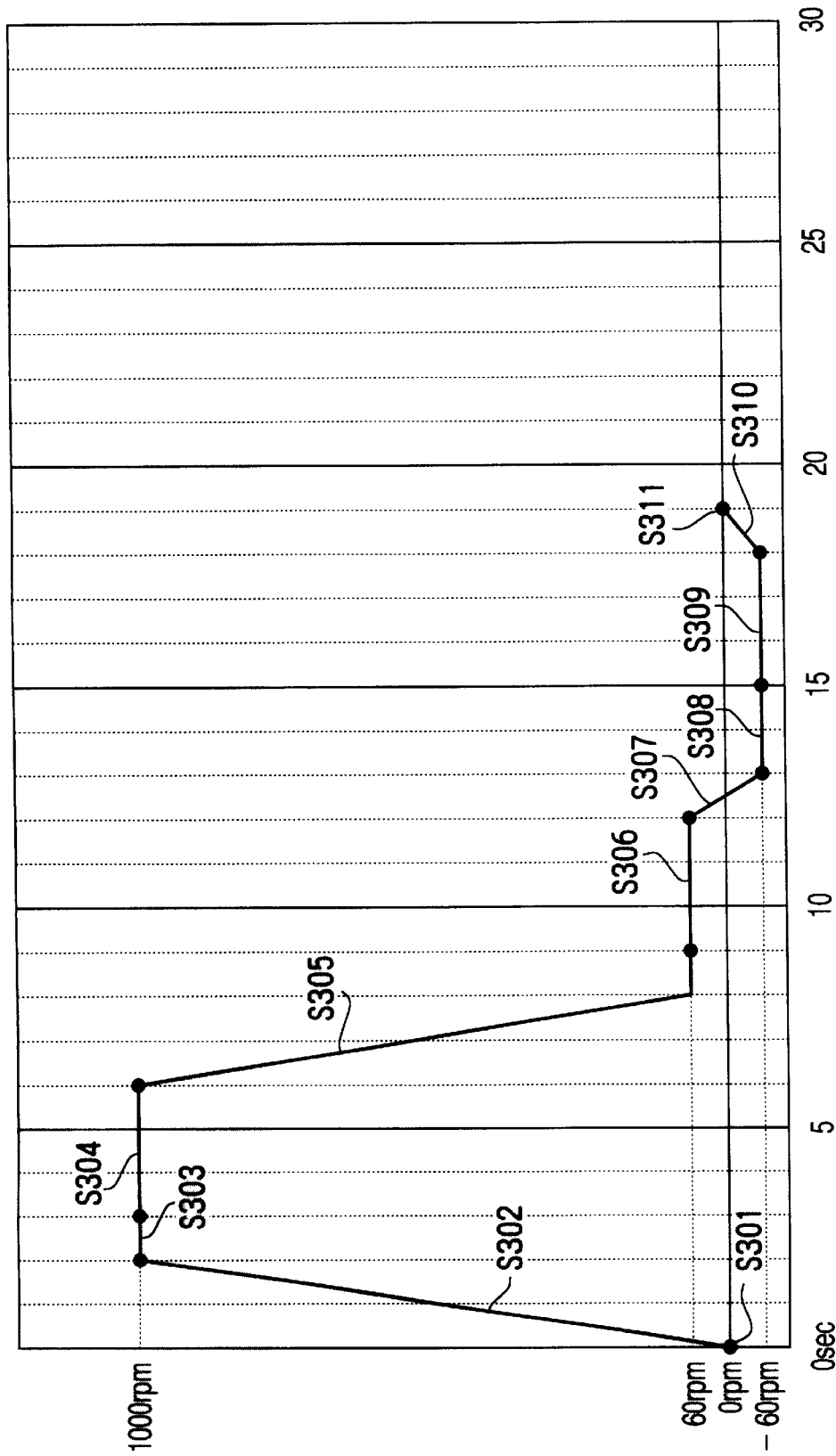

FIG. 16 schematically shows the motions of the motor associated with pulleys and the rotary drum in the radial direction of the spindle shown in FIG. 14;

FIG. 17 is a front view of an integrated measuring apparatus of the fourth embodiment of the invention;

FIG. 18 is a side sectional view of a spindle unit of the measuring apparatus shown in FIG. 17;

FIG. 19 is a time chart for illustrating the variation of the rotational speeds of the tested tire during the measurements of dynamic balance, high-speed uniformity and uniformity according to JASO C607 standard;

FIG. 20 is a time chart for illustrating the variation of the rotational speeds of the tested tire during the measurements of dynamic balance and high-speed uniformity; and FIG. 21 is a time chart for illustrating the variation of the rotational speed of the tested tire during the measurements of dynamic balance and uniformity according to JASO C607 standard.

DETAILED DESCRIPTION OF THE EMBODIMENTS

A measuring apparatus for uniformity and/or dynamic balance of a tire, which embodies the present invention, will be described hereinafter with reference to the accompanying drawings.

Figure 1:
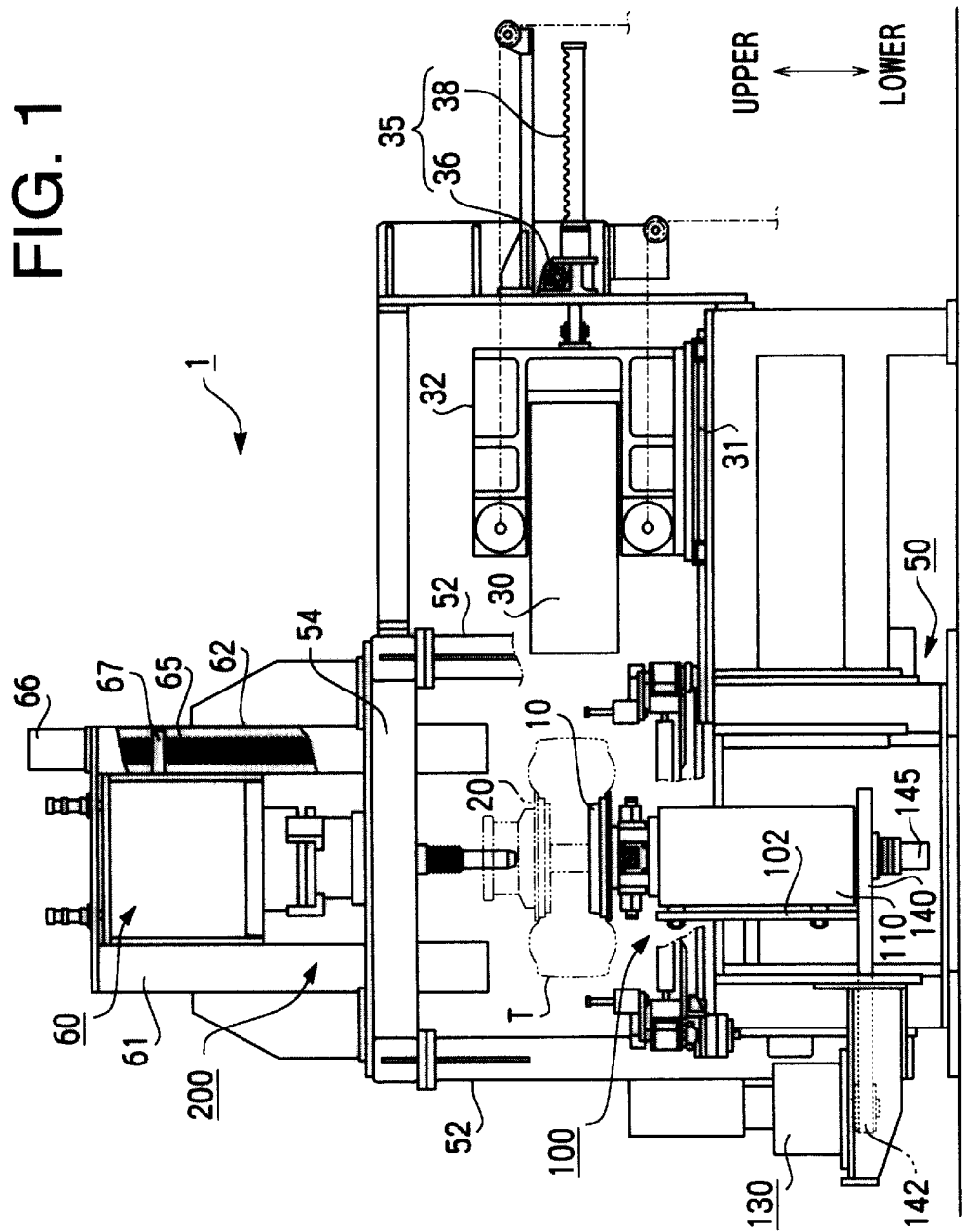
FIG. 1 is a front view of an integrated measuring apparatus according to a first embodiment of the invention.

FIG. 1 is a front view of an integrated measuring apparatus 1 according to a first embodiment of the invention. In the following description, "up" and "down" directions are defined as indicated in FIG. 1. It should be noted, however, the measuring apparatus 1 may be vertically inversely constituted or horizontally arranged instead of the disclosed one.

A frame of the measuring apparatus 1 includes a base 50, struts 52 extending upward from the base 50, and a roof 54 supported by the struts 52. A spindle unit 100 is mounted on the base 50.

The spindle unit 100 has a spindle 120 on which a tested tire T is to be mounted and a spindle housing 110 for rotatably supporting the spindle 120 via bearings. The spindle housing 110 is rigidly fixed to a rigid bar 50a in order to prevent the vibration of the spindle unit 100.

The measuring apparatus 1 is constituted to hold the tested tire T between an upper rim 20 and a lower rim 10. First, a tire supporting system will be described by referring to FIG. 2.

Figure 2:
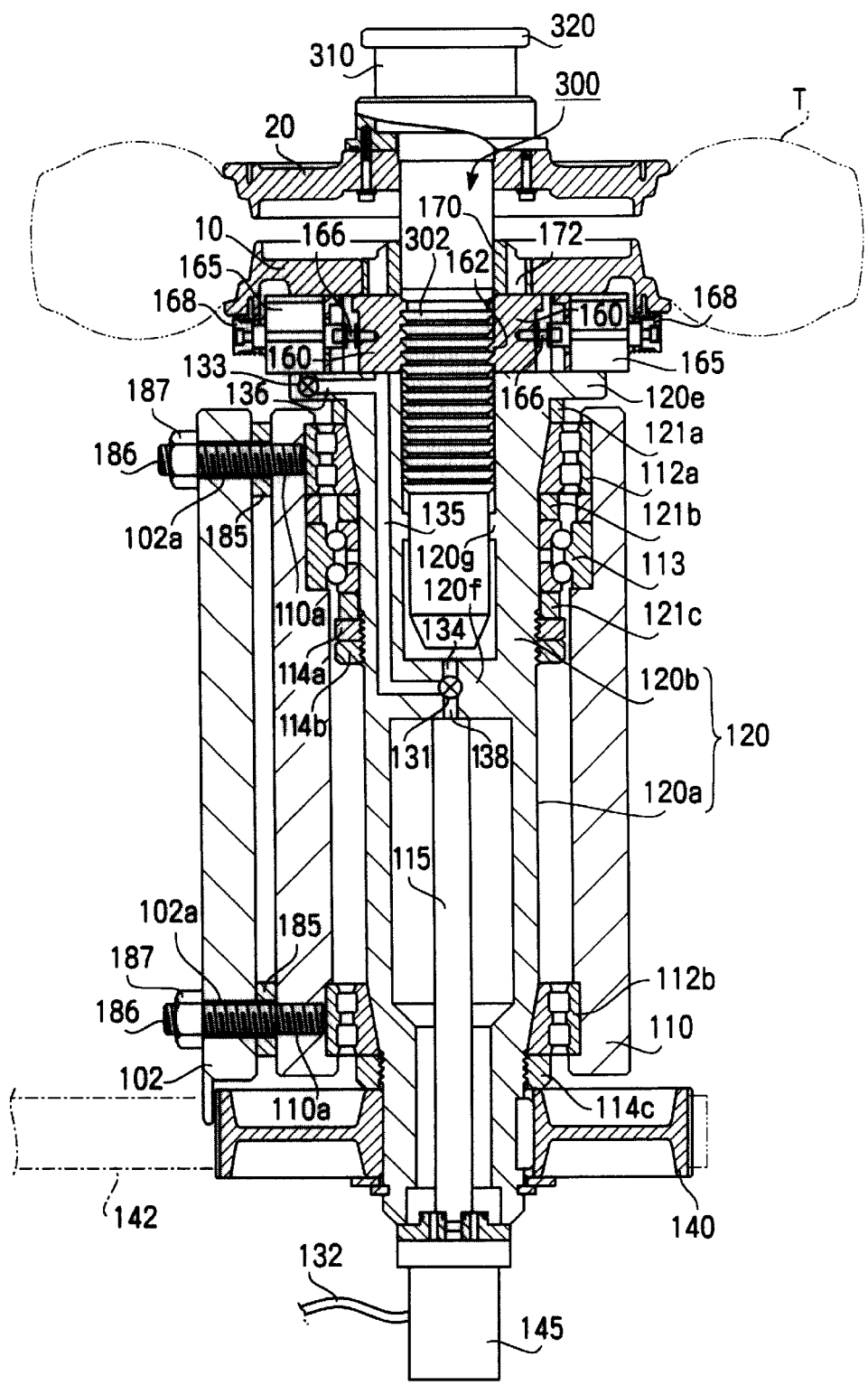
FIG. 2 is a cross-sectional side view of a spindle unit of the measuring apparatus shown in FIG. 1.

FIG. 2 is a cross-sectional side view of a spindle unit 100 of the measuring apparatus 1. The spindle 120 is a hollow shaft and the inner space thereof is divided into two parts by an intermediate plate 120f. The spindle 120 includes a hollow portion 120a and a bracket portion 120b upwardly connected from the hollow portion 120a. The intermediate plate portion 120f is formed between the hollow portion 120a and the bracket portion 120b. A flange portion 120e is formed at the upper end of the spindle 120.

An upper double-row cylindrical bearing 112a, a double-row angular contact ball bearing 113, and a lower double-row cylindrical bearings 112b are installed in this order between the spindle housing 110 and the spindle 120 so that the spindle 120 is rotatably supported. The double-row cylindrical bearings 112a and 112b are capable of supporting the spindle 120 from radial load. The double-row angular contact ball bearing 113 is back-to-back duplex form, being capable of supporting the spindle 120 from both the radial and thrust loads.

A hollow shaft 170 is coaxially fixed to the flange portion 120e of the spindle 120. The lower rim 10 is fixed on the upper end of the hollow shaft 170. A lock extending downwardly from the upper rim 20 is to be inserted into the bracket portion 120b through the hollow shaft 170 such that the tire T can be held between the lower and upper rims 10 and 20.

A protruded portion 120g is protruded as an inner flange on the inner circumferential surface of the bracket portion 120b. Since the inner diameter of the protruded portion 120g is just the same as the diameter of the lock shaft 300, the outer surface of the lock shaft 300 can be tightly fitted in the inner surface of the protruded portion 120g when the lock shaft 300 is inserted. The protruded portion 120g is located between the double-row cylindrical bearing 112a and the double-row angular contact ball bearing 113 so that the lock shaft 300 can be firmly supported by the two bearings via the protruded portion 120g.

Figure 3:
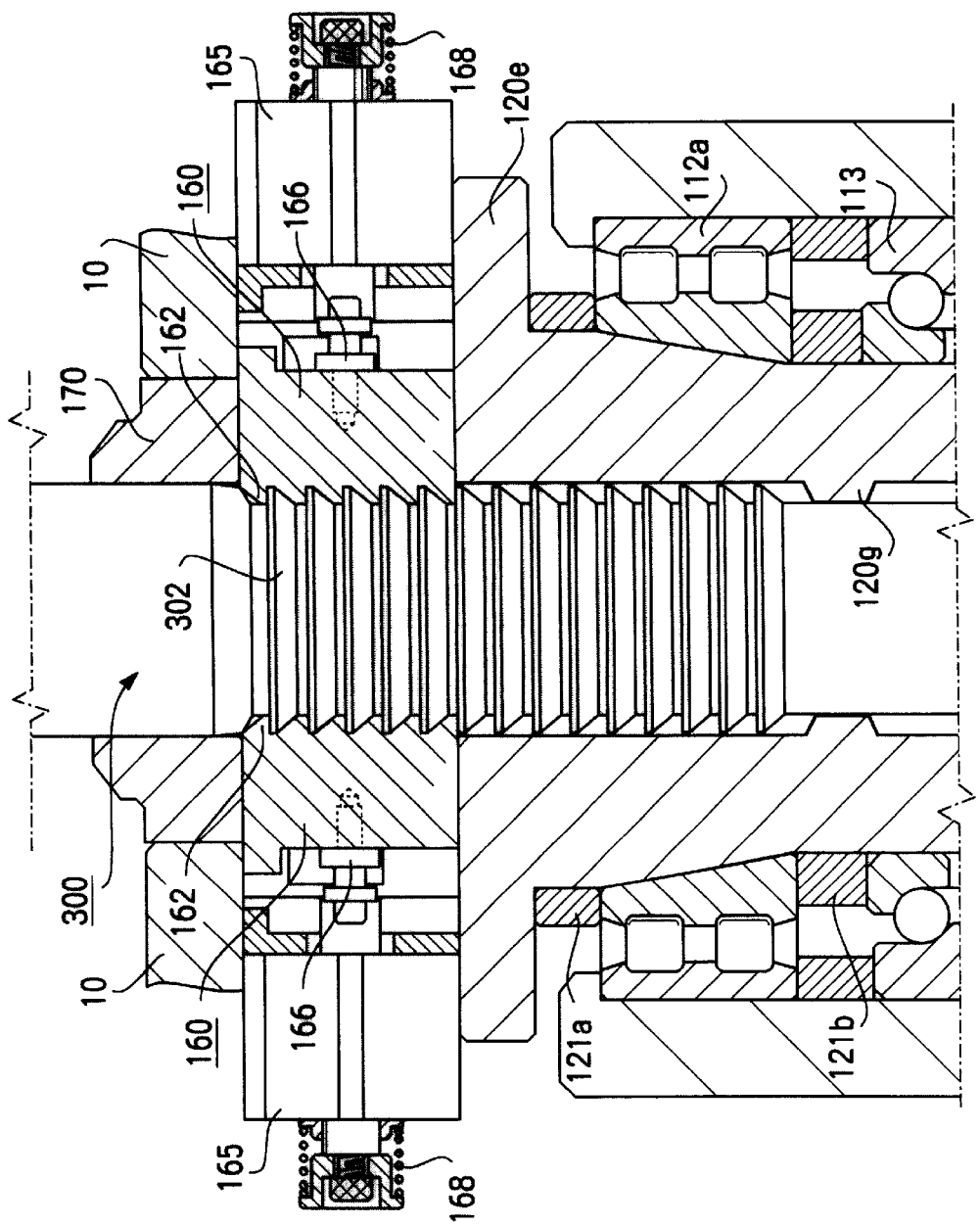
FIG. 3 is an enlarged cross-sectional view of an area around the hollow shaft of the spindle unit shown in FIG. 2.

FIG. 3 is an enlarged view of the upper end of the spindle 120 into which the lock shaft 300 is inserted. At the outer periphery of the lower part of the lock shaft 300, fifteen-step lock grooves 302 are formed vertically. The hollow shaft 170 is provided with four lock members 160 (only two lock members are shown in FIG. 3) which are arranged radially at an interval of 90 degrees about the axis of the spindle 120. Each of the lock members 160 is slidable, in the direction perpendicular to the axis of the spindle 120, toward and away from the axis of the spindle 120. Six-stepped lock claw 162 is formed on each of the lock members 160 to be engaged with the lock grooves 302 so as to lock the lock shaft 300 with respect to the spindle 120 when the lock member 160 is slid toward the axis of the spindle 120.

The height of the lock members 160 is substantially the same as the height of the cylindrical shaft 170, so that the tire T can be located as close to the double-row cylindrical bearings 112a as possible. The bending moment of the spindle 120 at the double-row cylindrical bearings 112a becomes lower during the uniformity measurement, and the deformation of the spindle 120 and the lock shaft 300 is lowered. Therefore, the uniformity can be measured at high accuracy with the deformations of the spindle 120 and the lock shaft 300 being prevented.

A locking cylinder 165 for driving each of lock members 160 is mounted to the outer peripheral end of the hollow shaft 170. The locking cylinder 165 is driven by supplying air thereto. The lock member 160 is secured to the tip end of a plunger 166 of the locking cylinder 165. The plunger 166 is urged in the direction to be away from the lock shaft 300 by a spring 168. That is, the lock member 160 is urged in the direction to be disengaged from the lock shaft 300. Due to the above-described mechanism, the lock member 160 engages with the lock shaft 300 when the locking cylinder 165 is operative, and the lock member 160 disengages from the lock shaft 300 when the locking cylinder 165 is inoperative.

As constituted above, by inserting the lock shaft 300 into the bracket portion 120b of the spindle 120, and making the locking cylinder 165 operative, the tire T can be surely retained between the lower rim 10 and upper rim 20. On the contrary, by making the locking cylinder 165 inoperative, the lock shaft 300 becomes free and can be pulled out of the spindle 120, thereby the tire T can be removed between the lower rim 10 and the upper rim 20.

It should be noted that a proximity switch (not shown in FIG. 3) is placed closely adjacent to each of the locking cylinders 165. The proximity switch is capable of detecting the lock cylinder 165 mounted within the limit of 1 mm therefrom. The lock cylinder 165 approaches within the limit of 1 mm from the proximity switch when the locking cylinder 165 is inoperative. Therefore, whether the lock members 160 engages with the lock shaft 300 or not can be detected by monitoring the status of the proximity switch.

Figure 4:
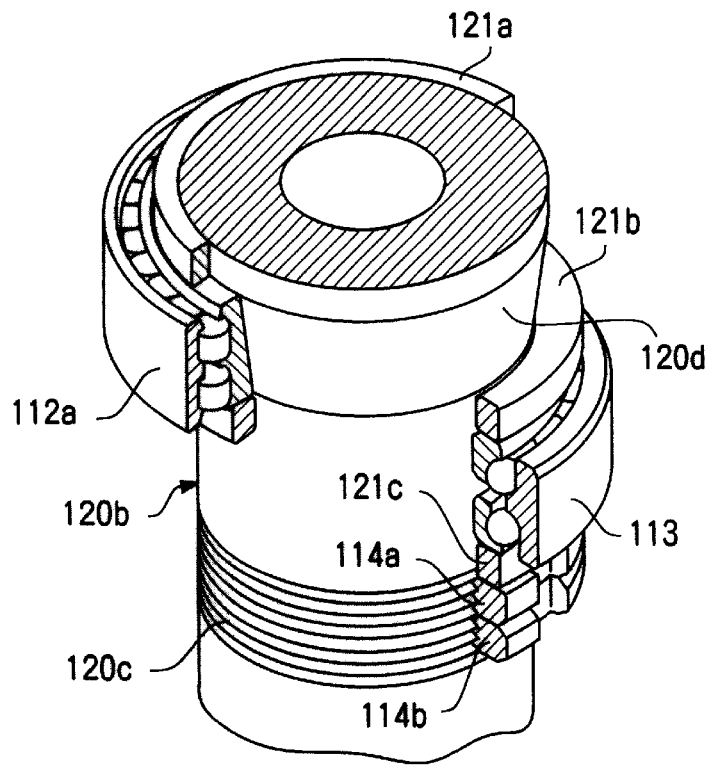
FIG. 4 is an enlarged view of an upper end portion of the spindle shown in FIG. 2.

00761 Next, a procedure for attaching the bearings to the spindle 120 will be described with reference to FIG. 4. FIG. 4 is an enlarged view of the upper end portion of the spindle 120 of the embodiment. A first collar 121a, the upper double-row cylindrical bearing 112a, a second collar 121b, the double-row angular contact ball bearing 113, a third collar 121c, an urging nut 114a and an anti-loosening nut 114b are coaxially installed in this order.

The first collar 121a having a square cross-section is installed at the bracket portion 120b of the spindle 120. The upper end surface of the color 121a contacts the lower surface of the flange portion 120e of the spindle 120.

An upper tapered surface 120d is formed at the upper part of the bracket portion 120a. The upper double-row cylindrical bearing is to be attached at the upper tapered surface 120d. The upper tapered surface 120d is made such that an upper portion having a larger diameter. The inner surface of the inner ring of the upper double-row cylindrical bearing 112a is tapered fittably on the upper tapered surface 120d. The upper end of the upper tapered surface 120d is broader a little than the upper end of the inner surface of the inner ring of the upper double-row cylindrical bearing 112a, therefore the inner surface of the inner ring of the upper double-row cylindrical bearing 112a tightly contacts the upper tapered surface 120d when the upper double-row cylindrical bearing 112a pressed upwardly. The upper end of the upper double-row cylindrical bearing 112a contacts the lower end of the first collar 121a by pressing the upper double-row cylindrical bearing 112a upwardly.

The second collar 121b having a square cross-section is installed such that the upper end thereof contacts the lower end of the upper double-row cylindrical bearing 112a. Furthermore, the double-row angular contact ball bearing 113 is installed such that the upper end thereof contacts the lower end of the second collar 121b. Moreover, the third collar 121c having a square cross-section is installed such that the upper end thereof contacts the lower end of the double row angular contact ball bearing 113.

A first threaded surface 120c is formed on the circumferential surface of the bracket portion 120b. The first threaded surface 120c locates below the lower end of the third collar 121c when the first collar 121a, the upper double row cylindrical bearing 112a, the second collar 121b, the double row angular contact ball bearing 113 and the third collar 121c are installed.

The urging nut 114a is attached to the first threaded surface 120c and screwed upwardly for pressing the first collar 121a, the upper double-row cylindrical bearing 112a, the second collar 121b, the double-row angular contact ball bearing 113 and the third collar 121c. The urging nut 114a is tightened to predetermined torque. The anti-loosening nut 114b is further installed to the first threaded surface 120c such that the upper end thereof contacts the lower end of the urging nut 114a, for pressing upwardly and preventing the urging nut from being loosened.

As described above, the inner surface of the inner ring of the first collar 121a, the upper double-row cylindrical bearing 112a tightly fit on the tapered surface 120d, therefore the upper double-row cylindrical bearing 112a is rigidly secured between the spindle 120 and the spindle housing 110 so that the play therebetween can be prevented. Furthermore, the clearances between the inner ring and steel balls of the double row angular contact ball bearing 113 and between the steel balls and the outer ring are made closer as well, so that the plays therebetween can be prevented.

It should be noted that the attaching of the lower double-row cylindrical bearing 112b is processed as well as the above-described procedure for attaching the upper double-row cylindrical bearing 112a. The radial load applied to the lower double-row cylindrical bearing 112b supports is smaller than the load applied to the upper double-row cylindrical bearing 112a supports, therefore the lower double-row cylindrical bearing 112b is just pressed by an urging nut upwardly, and an anti-loosening nut does not have to be attached. That is, as shown in FIG. 2, for attaching the lower double-row cylindrical bearing 112b, the urging nut is screwed on the threaded surface formed on the circumferential surface of the hollow portion 120a after the lower double-row cylindrical bearing 112b is mounted.

In this embodiment, the radial force variation can be measured by load cells (not shown in FIG. 1) mounted on a rotary drum 30 of the apparatus 1 during the uniformity measurement.

On the other hand, the eccentricity of the tested tire is measured by piezoelectric force sensors fixed to the spindle housing 110 during the dynamic balance measurement. The spindle housing 110 is a rectangular pillar in which a through hole for the spindle 120 is formed along the axis thereof. The piezoelectric force sensors 185 are mounted on one surface of the spindle housing 110. The surface is formed perpendicular to a direction in which the rotary drum 30 can press the tire C during the uniformity measurement.

The piezoelectric sensor 185 is a cylindrically-shaped force sensor having a 0–10000 kgf measurement range. For measuring at higher accuracy, the piezoelectric sensor 185 is rigidly fixed to the spindle housing 110.

Therefore, the piezoelectric force sensors 185 are tightly held between the circumferential surface of the spindle housing 110 and a sensor fixing plate 102. A plurality of through holes 102a on the sensor fixing plate 102 is formed at the areas which the piezoelectric sensors 185 contact. Tapped holes 110a are formed on the circumferential surface of the spindle housing, and the areas at which the tapped holes 110a are formed are the areas on which the piezoelectric force sensors 185 are mounted.

For securing the sensor fixing plate 102, threaded bars 186 are screwed in the tapped holes 110a through the through holes 102a and the inner surface of the piezoelectric sensors 185. It should be noted that the tips of the threaded bars 186 toward the spindle 120 contact the outer ring of the upper or lower double-row cylindrical bearings 112a or 112b.

A nut 187 is attached to each of the threaded bars 186 and press the sensor fixing plate 102 toward the spindle housing 110, therefore the sensor fixing plate 102 becomes capable of strongly pressing the piezoelectric sensor 185 at approximately 5000 kgf so that the piezoelectric sensors are tightly fixed.

As shown in FIG. 2, a pulley 140 for rotationally driving the spindle 120 is mounted at the lower end of the spindle 120. An endless belt 142 is wound around the pulley 140 so that the pulley 140 is rotationally driven via the endless belt 142 by a spindle driving motor 130 which is fixed on the base 50. That is, when the spindle driving motor 130 is driven, the spindle 120 is rotated with the tire T held between the lower and upper rims 10 and 20.

The spindle 120 includes air paths via which air is fed from a rotary joint 145 mounted on the lower end of the hollow portion 120a to the tire T for inflating the tire T. In the hollow portion 120a, an air pipe is fixed for feeding the air. The lower end of the air pipe 115 contacts an air exhaust of the rotary joint 145. A flange portion for fixing to the lower face of the intermediate plate 120f is formed on the upper end of the air pipe 115. An air path portion 138 which contacts the upper end of the air pipe 115 is formed in the intermediate plate 120f.

An air hose 132 for feeding the air into the rotary joint 145 is connected to an air intake of the rotary joint 145. The air through the air hose 132 passes through the air pipe 115 and the air path 138, then enters a switching valve 131. The switching valve 131 is capable of switching the air entered therein to either the inner space of the bracket portion 120a or an air path 135 connecting to an air path 172 formed in the hollow shaft 170. The air path 172 contacts the space between the lower and upper rims 10 and 20, so that the air through the air path 172 goes in the tire T when the tire T is held. When the wheelless tire is to be tested, the switch valve is always switched to feed the air to the air path 135. Accordingly, the air supplied via the rotary joint 145 from the air hose 132 is fed into the tire T through the air path 172.

As described above, the rotary joint 145, the air pipe 115, the air paths 138, 135 and 172, and the switch valve 131 constitute an air supplying system for inflating the tire T. An air path 136 is split from the air path 135 and connected to the locking cylinder 165. In the intermediate part of the air path 136, a check valve 133 is attached. The air is supplied to the locking cylinder 165 and the locking cylinder 165 becomes operative when the check valve 133 is opened.

As shown in FIG. 2, a circular pillar shaped mounting portion 310 is mounted on the top surface of the upper rim 10. The mounting portion 310 is to be chucked by an inserter unit 200 (shown in FIG. 1) of the measuring apparatus when the tested tire T is mounted or unmounted between the lower and upper rims 10 and 20. On the upper end of the mounting portion 310, a flange portion 320 to which chucking claws 210 (will be described hereinafter) of the inserter unit 200 is formed.

As shown in FIG. 1, the inserter unit 200 is hanged under the lower end of an elevating housing 60 which is mounted on the roof 54. By four linear guides 61 upwardly extending from the roof 54, the elevating housing 60 is supported movably in up-and-down direction. The elevating housing 60 is driven by a cross feed screw system having a ball screw 65 rotatably driven by the servomotor 66 and an arm 67 which engages with the ball screw 65. The arm 67 is fixed to the elevating housing 60, therefore the inserter unit 200 can be movable upwardly or downwardly when the servomotor 66 rotates the ball screw 65.

Figure 5:
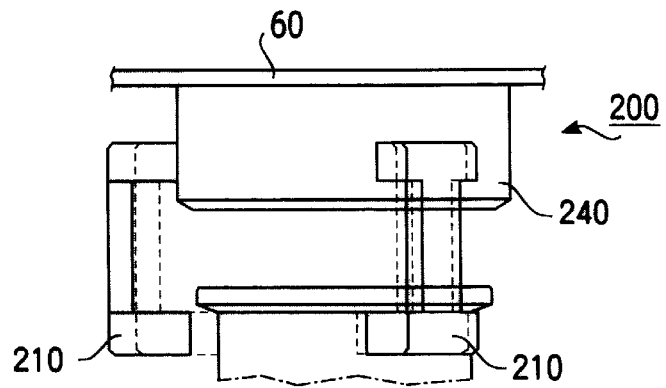
FIG. 5 is an enlarged side view of the inserter unit of the measuring apparatus shown in FIG. 1.

FIG. 5 is a side view of the inserter unit 200. The inserter unit 200 is provided with a substantially cylindrically-shaped inserter unit body 240. The inserter unit body 240 is hanged under the elevating housing 60, coaxially with the spindle 120.

On the lower portion of the inserter unit body 240, three chucking claws 210 (two of three claws 210 are shown in FIG. 5) are arranged radially. Each of the chucking claws 210 is urged outwardly in the radial direction by a spring member (not shown).

The chucking claws 210 are driven by the compressed air so as to be movable in the radial direction. That is, the compressed air presses and moves inwardly the chucking claws 210 when the compressed air is supplied into the air intake (not shown in FIG. 5) of the inserter unit body 240. Therefore, the locking claws 210 are capable of chucking the handle member by supplying the compressed air to the inserter unit body 240. On the other hand, the chucking claws 210 moves outwardly and the mounting portion 310 can be released when the compressed air is exhausted from the inserter unit body 240.

The measuring apparatus 1 constituted as above holds the tire T as described below.

First, the compressed air is supplied into the inserter unit body 240, so that the chucking claw 210 chucks the mounting portion 310, and the ball screw 65 is driven to elevate elevating housing 60 in order to pull the lock shaft 300 out of the spindle 120. Then, the tire T is set on the lower rim 10. Then, the ball screw 65 is re-driven to place the inserter unit body 240 at the position, depending upon the width of the tire T, so that the tire T is held between the lower and upper rims 10 and 20. Next, the locking cylinder 165 is driven to be operative to engage the lock member 160 to the lock shaft 300. Finally, the compressed air injected into the inserter unit body 240 is exhausted for releasing the lock shaft 300 from the chucking claws 210, the upper rim 10 becomes capable of rotating in association with the spindle 120.

The dynamic balance measurement will be described hereinafter.

After the tested tire T is held between the lower and upper rims 10 and 20, the tire T is inflated. Then the spindle is rotated at a predetermined speed (i.e., to predetermined rotational speeds per unit period). It should be noted that the piezoelectric force sensors 185 are capable of measuring force at little deformation thereof, so that the centrifugal force caused in the tested tire T can be measured although the vibration of the spindle is prevented. The control unit (not shown) calculates the eccentricity of the tire T based on the measured centrifugal force. The method for calculating the dynamic balance based on the measured centrifugal force is well known, so description thereof is omitted. The control unit further determines at which portion of the tire T a balance weight is to be placed, based on the result of the calculation of the dynamic balance, and the measuring apparatus 1 uses a marking device (not shown) to mark this portion.

The uniformity measurement uses a rotating drum 30 (see FIG. 1). The rotating drum 30 is mounted in a movable housing 32 that can slide on rails 31 extending in a direction in which the drum 30 approaches and departs from the tire T, and is moved by a rack and pinion mechanism 35 (a pinion 36 and a rack 38) that is driven by a motor (not shown). Then the spindle is rotated at a predetermined speed (i.e., at a predetermined rotational speeds). The predetermined number of the revolution, for instance, may be 60 r.p.m. for a uniformity measurement according to the JASO C607 standard.

During the uniformity measurement, the control unit of the measuring apparatus 1 drives the motor to press the rotary drum 30 against the tire T. It should be noted that the amount of the force at which the rotary drum 30 presses the tire T depends upon the type of the tire T. The amount is, for instance, approximately 1000 kgf for measuring the tire for passenger car. Then, force variation in load effected on the load cells mounted on the rotary drum 30 is detected during the rotation of the spindle 120. The method for calculating the uniformity based on the detected load is well known, so its description is omitted. The control unit further determines which portion of the tire T should be cut away, based on the result of the calculation of the uniformity, and the measuring apparatus 1 uses a cutting device (not shown) to cut this portion.

As above, the measurement apparatus 1 according to this embodiment, enables a single apparatus to measure both uniformity and dynamic balance of tested tire.

Furthermore, the measuring apparatus 1 is capable of measuring uniformity and the dynamic balance of the wheeled tire by using a wheel-securing mechanism instead of above-mentioned tire holding mechanism. The wheel-securing mechanism will be described hereinafter.

Figure 6:
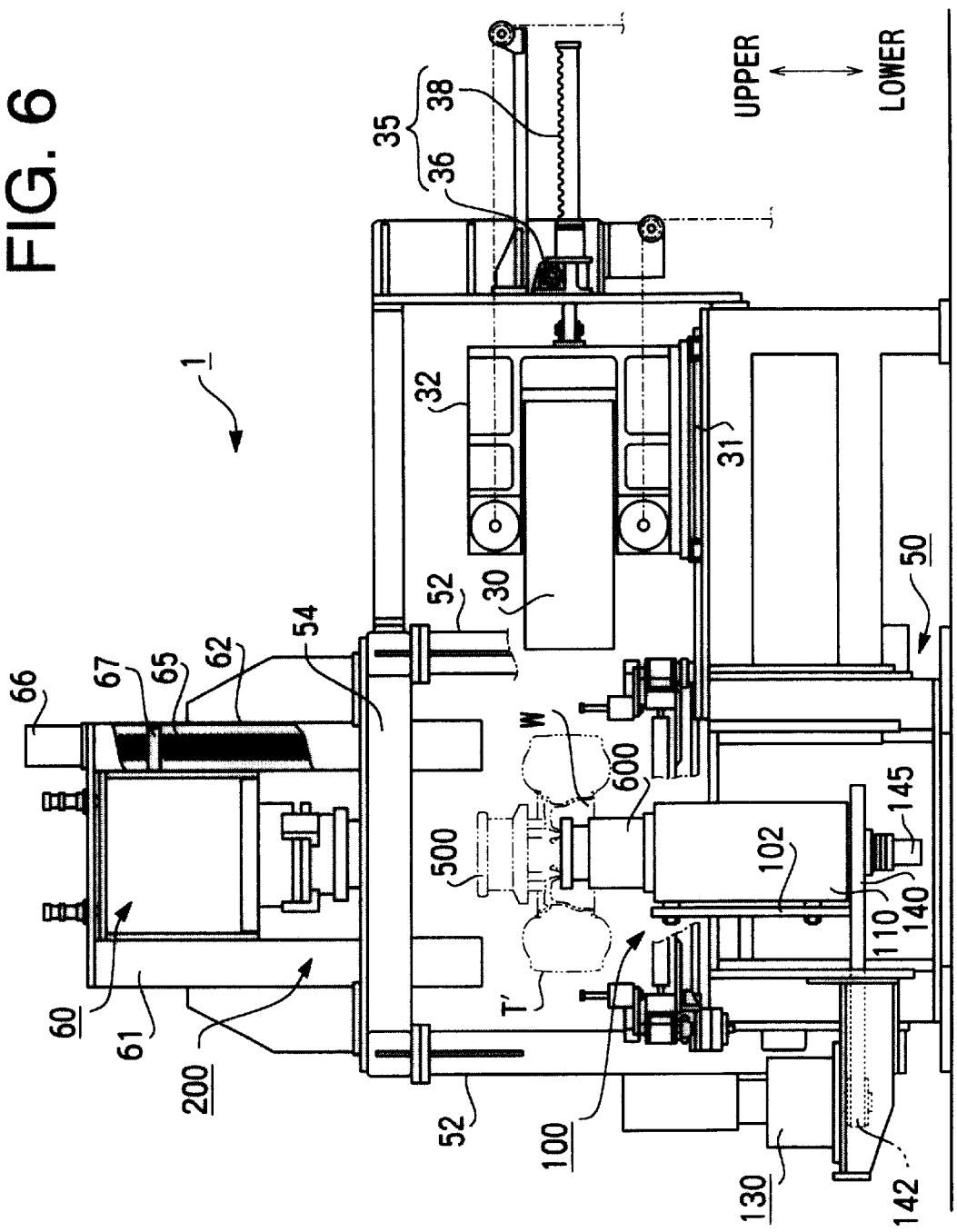
FIG. 6 is a front view of an integrated measuring apparatus shown in FIG. 1, which enables to measure uniformity and dynamic balance of a wheeled tire.

FIG. 6 is a front view of an integrated measuring apparatus shown in FIG. 1, with which uniformity and dynamic balance measurement of the wheeled tire can be performed using a top adapter 500 and a pulling cylinder unit 600. The top adapter 500 for downwardly urging the wheel of the wheeled tire is used instead of the upper rim 10 and the lock shaft. The pulling cylinder unit 600 for driving the top adapter downwardly and locking it is used instead of the lower rim 10, the hollow shaft 170, the lock member 160 and the locking cylinder 165.

Figure 7A:
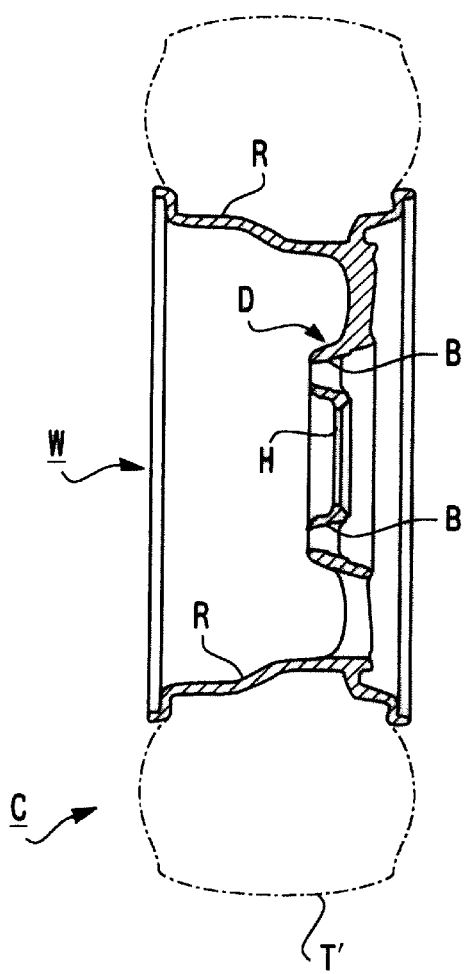
FIG. 7A is a cross-sectional side view of a wheeled tire to be measured by the apparatus shown in FIG. 6.
Figure 7B:
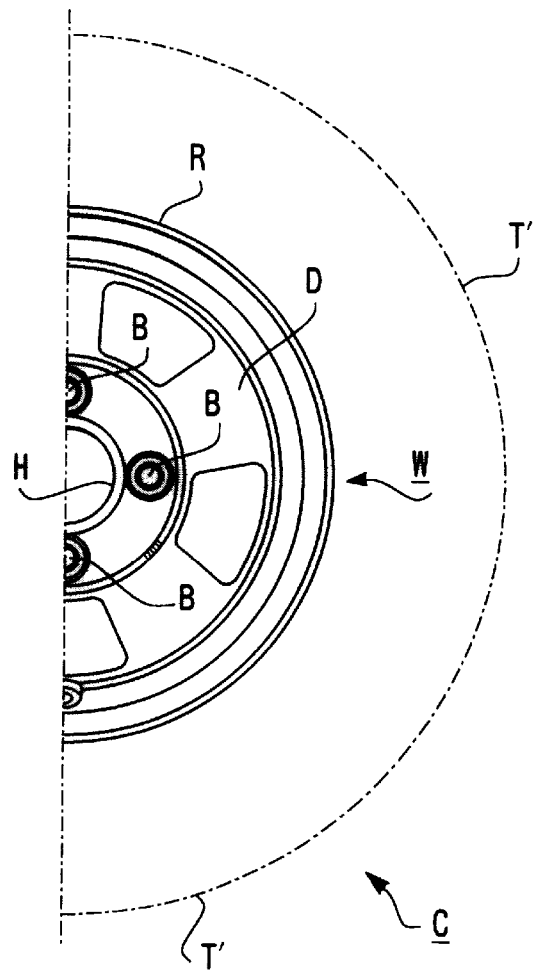
FIG. 7B is a plan view of the wheeled tire shown in FIG. 7A.

FIGS. 7A and 7B show a cross-sectional side view and a plan view of a typical wheeled tire C, respectively. As shown in FIGS. 7A and 7B, a wheel W of the wheeled tire C consists of a rim portion R to which tire T' is attached and a dick portion D to which a hub and other member can be attached. A hub hole H is formed at the central area of the dick portion D and a plurality of bolt holes B (four holes are shown in the FIGS. 7A and 7B) are radially arranged around the hub hole H.

Figure 8:
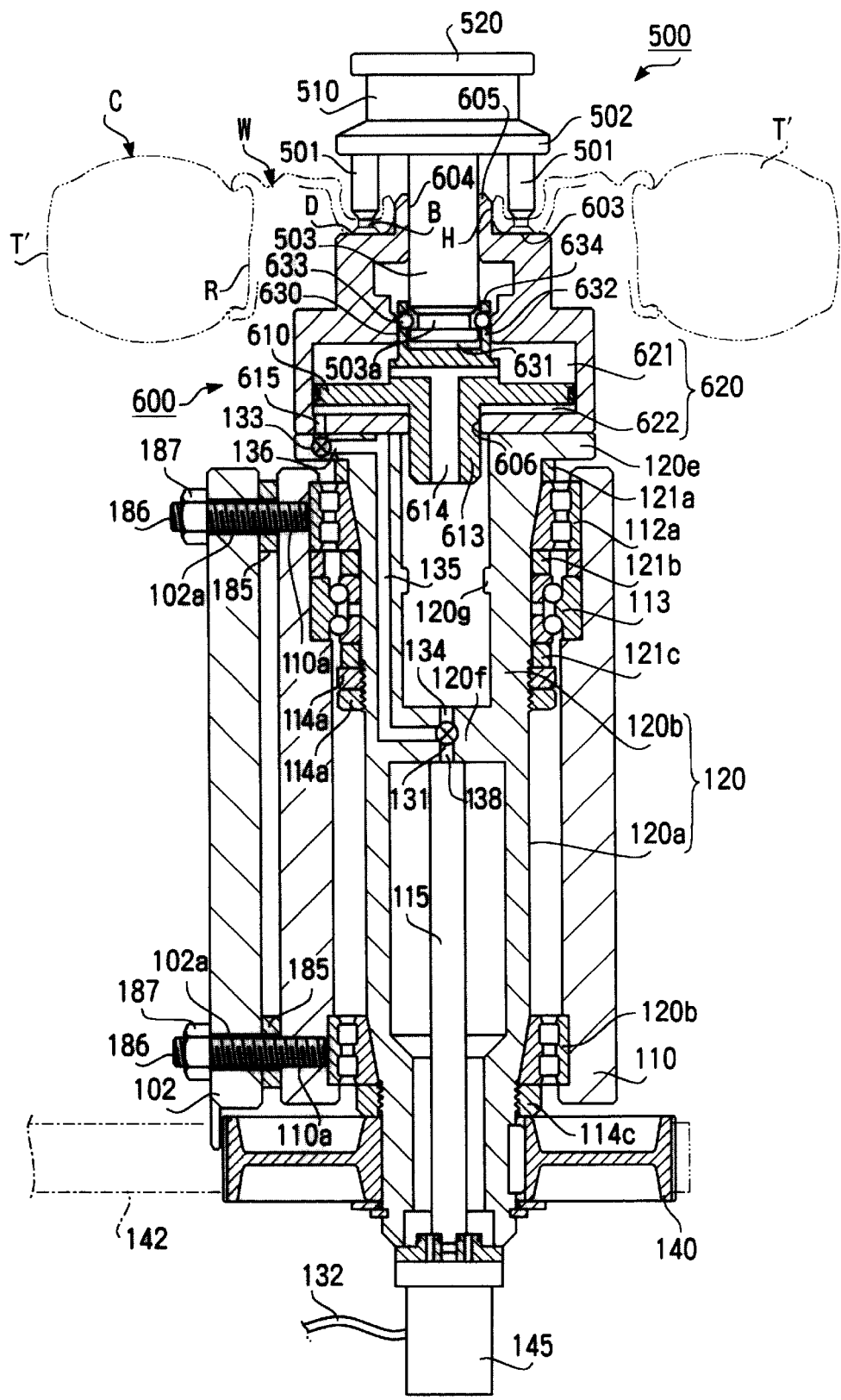
FIG. 8 is a cross-sectional side view of a spindle unit of the measuring apparatus shown in FIG. 6, wherein the wheeled tire is secured.

FIG. 8 is a cross-sectional side view of a spindle unit 120 of the measuring apparatus 1 shown in FIG. 6, wherein the wheeled tire is secured. The pulling cylinder unit 600 is fixed on the flange portion 170 of the spindle 120. At the central area of an upper surface 603 of the pulling cylinder unit 600, a shaft insertion hole 604 is formed. A protruded portion 605 is cylindrically and upwardly protruded around the shaft insertion hole 604. It should be noted that the pulling cylinder unit 600 is fixed on the spindle 120 such that the shaft insertion hole 604 is arranged coaxially to the spindle 120. Since the diameter of the outer surface of the protruded portion is substantially the same as the diameter of the hub hole H, the wheeled tire C can be positioned coaxially to the spindle 120.

The top adapter 500 is attached above the pulling cylinder unit 600. The top adapter 500 includes a column-shaped mounting portion 510, a circular disk portion 502 formed on the lower end of the mounting portion, a flange portion 520 formed on the upper end of the mounting portion 510, an insertion shaft 503 extending downwardly from the central area of the circular disk portion 502, and a plurality of pins 501 (four pins are used in this embodiment) extending downwardly from the circular disk portion 502 and arranged about the insertion shaft 503. The mounting portion 510 and the flange portion 520 are to be chucked by the inserter unit 200 when the tire C is mounted or unmounted. The insertion shaft 503 is to be inserted in the shaft insertion hole 604 when the top adapter 500 is attached to the pulling cylinder unit 600. Each of the pins 501 is positioned at lower tips thereof, contacting a bush inserted in the each of the bolt halls B.

The method for moving the top adapter 500 using the inserter unit is the same as the method for the upper rim 20 and lock shaft 300 described above, and therefore description thereof will be omitted.

As shown in FIG. 8, the inner space 620 of the pulling cylinder unit 600 is separated by a circular-disk-shaped piston 610. The piston 610 is movable in the axial direction in the inner space 620 of the pulling cylinder unit 600. A guide shaft 613 is downwardly extending from the piston 610. The circumferential surface of the guide shaft 613 is slidably fitting in a inner surface of a guiding hole which is formed on the bottom end of the pulling cylinder unit 600. Therefore, the piston 610 is held to be perpendicular to the axis of the spindle 120. It is noted that the lower end of the guide shaft 613 is kept to be located in the bracket portion 120b of the spindle 120 through the guiding hole 606.

The piston 610 is driven by injecting air into either of the divided portions of the inner space 620 of the pulling cylinder unit 600. In order to inject the air into the upper divided portion 621 of the inner space 620, an air path 614 is formed in the guide shaft 613. The air path 614 connects the inner space of the bracket portion 120b to the upper divided portion 621.

In order to inject the air into a lower divided portion 622 of the inner space 620 of the pulling cylinder unit 600, another air path 615 is formed on the lower end of the pulling cylinder unit 600. The air path 615 is connecting the lower divided portion 622 to the air path 136.

Therefore, if the switching valve 131 switches the air entered therein to the inner space of the bracket portion 120b, the air from the rotary joint 145 is supplied to the upper divided portion 621 via the bracket portion 120b and the air path 614 so that the pressure in the upper divided portion 621 raises and the piston 610 moves downwardly. On the other hand, if the switching valve 131 switches the air entered therein to the air path 135, the air from the rotary joint 145 is supplied to the lower divided portion 62 via the air paths 135 and 136 so that the pressure in the lower divided portion 622 raises and the piston 610 moves upwardly.

On the upper surface of the piston 610, a cylindrically-shaped shaft connector 630 is formed. The insertion shaft 503 is to be slidably inserted in the inner space 631 of the shaft connector 630 when the pulling cylinder unit 600 locks the top adapter 500. The insertion shaft 503 can be locked to the shaft connector 630 using a collet chuck mechanism. At least one through hole 634 is radially formed on the circumferential surface. A steel ball 633 is held in the through hole 634 and movable in the radial direction of the spindle 120. Furthermore, the inner ends of the through hole 634 is constituted to be narrower for preventing the steel ball 633 from dropping into the inner space 631 of the shaft connector 630.

A inner wall 640 for chucking the insertion shaft 503 is formed in the pulling cylinder unit 600 around the outer surface of shaft connector 630. The lower portion 641 of the inner wall 640 is slidably contacts the outer surface of the shaft connector 630. The thickness of the cylindrical portion 632 of the shaft connector 630 is thinner than the diameter of the steel ball 633, therefore the steel ball 633 is protruded from the through hole 634 inwardly when the shaft connector 630 moves downwardly and the through hole 634 is located at the lower portion 641 of the inner wall 640. On the other hand, the diameter of the upper portion 642 is broader than the diameter of the shaft connector 630, therefore the steel ball 633 can be protruded outwardly from the through hole 634 and the insertion shaft 503 can be slidably inserted in the inner space 631 of the shaft connector 630.

Figure 9A:
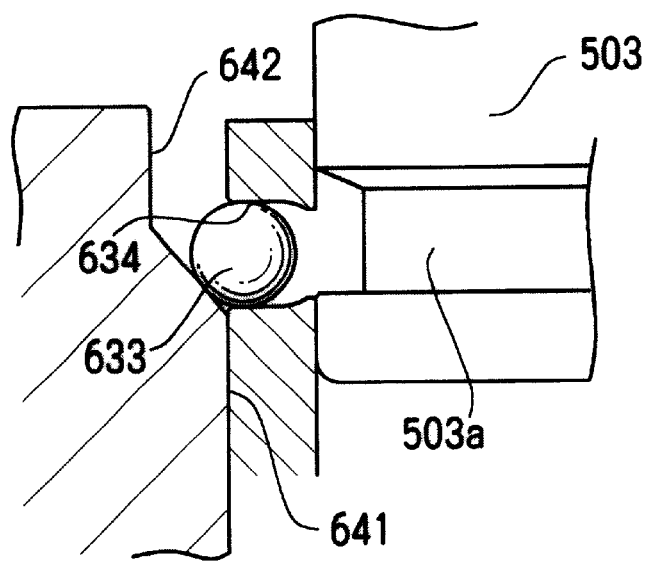
FIGS. 9A and 9B are enlarged views of a pulling cylinder unit shown in the FIG. 8.
Figure 9B:
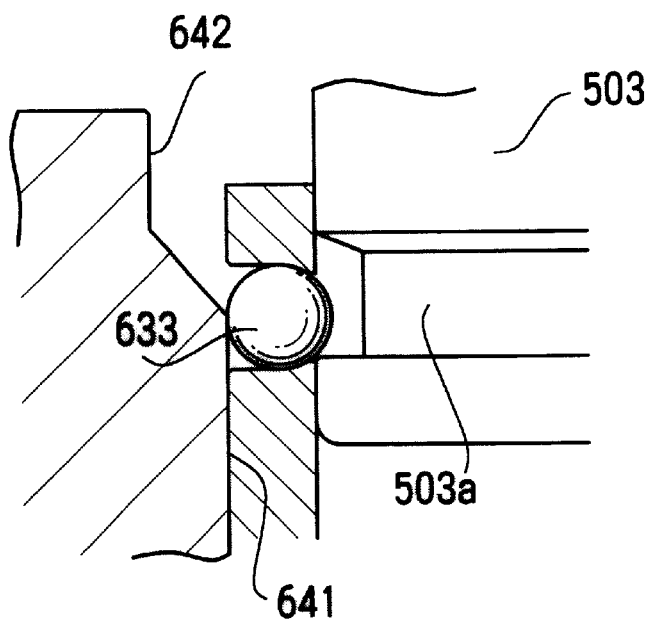
Figure 10:
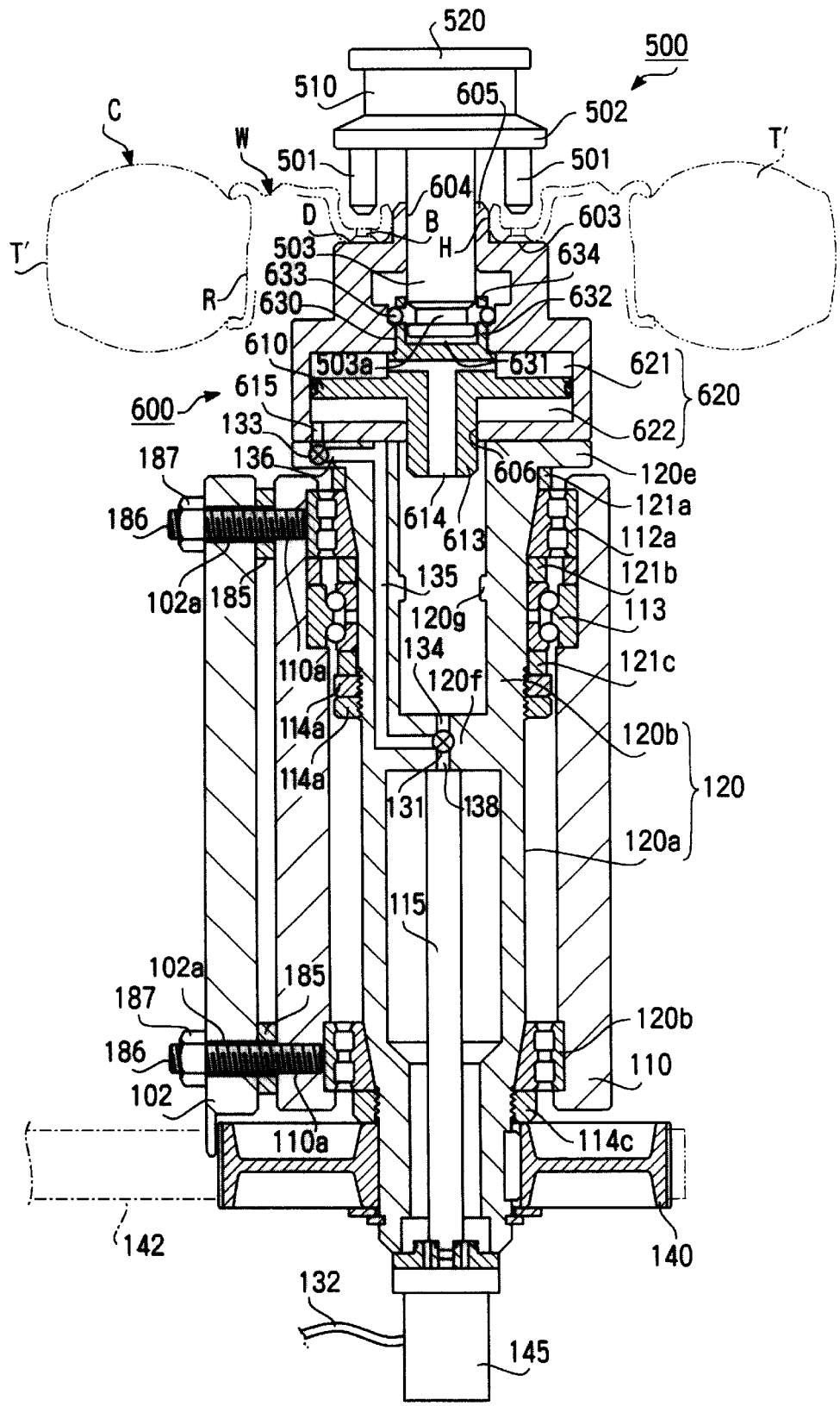
FIG. 10 is another cross-sectional side view of a spindle unit shown in FIG. 8, wherein the wheeled tire is not secured.
Figure 11:
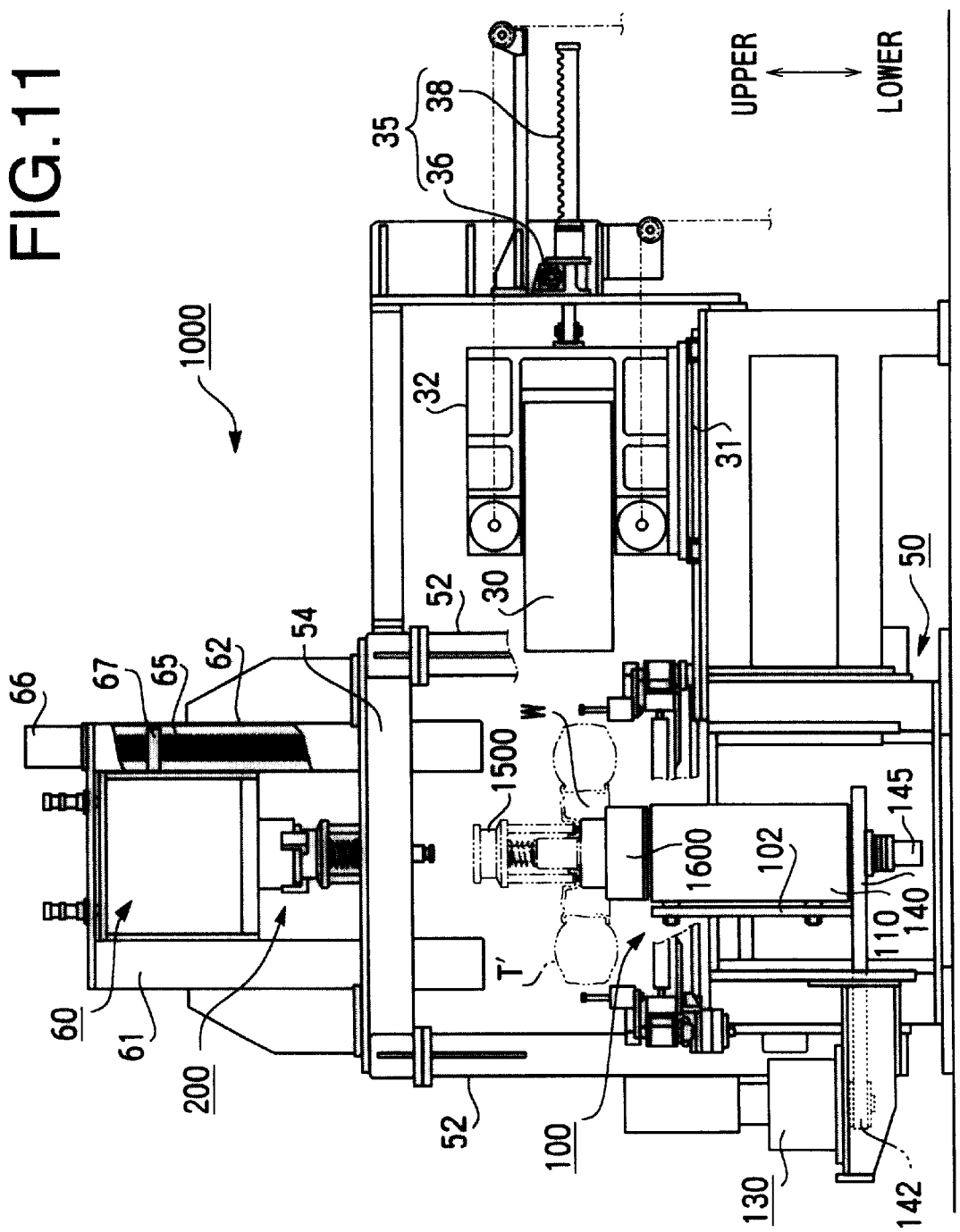
FIG. 11 is a front view of an integrated measuring apparatus according to a third embodiment of the invention.

The procedure for chucking the top adapter 500 to the pulling cylinder unit 600 will be described hereinafter with reference to FIGS. 9A and 9B. First, the through hole 634 is located at the upper portion 642 of the inner wall 640. Then, as shown in FIG. 9A, the insertion shaft is inserted as a horizontal groove 503a formed on the lower end thereof is positioned at the through hole 634. Then, the shaft connector 630 is pulled downwardly by driving the piston 610. As shown in FIG. 9B, the lower portion 641 of the inner wall 640 becomes urging the steel ball inwardly and the protruded portion of the steel ball 633 meshes with the horizontal groove 503a of the insertion shaft 503. The insertion shaft associated with the shaft connector 630 is pulled downwardly when the shaft connector 630 is further driven downwardly. As shown in FIG. 8, each of the pins 501 urges the disk portion D of the wheel W downwardly and the wheeled tire C is tightly secured between the top adapter 500 and the pulling cylinder unit 600 when the insertion shaft 503 is pulled downwardly.

On the other hand, if the switching valve 131 switches to inject the air into the lower divided portion 622 while the wheeled tire C is locked, the shaft connector 630 associated with the piston 610 moves upwardly. The horizontal groove 503 and the through hole 634 become located at the upper portion of the inner wall 640, so that the insertion shaft 503 becomes releasable from the shaft connector 630.

It should be noted that the scope of the invention is not limited to this embodiment described above. For instance, another mechanisms for securing the wheeled tire can be used. An example of such mechanisms will be described as a second embodiment.

FIG. 14 shows a front view of a measuring apparatus 1000 in accordance with the second embodiment of the present invention. The measuring apparatus 1000 is similar to the first embodiment except that another top adapter 1500 and another pulling cylinder unit 1600 are employed. Other constitutions of the apparatus 1000 is the same as the measuring apparatus 1 of the first embodiment, and its description will be omitted.

Figure 12:
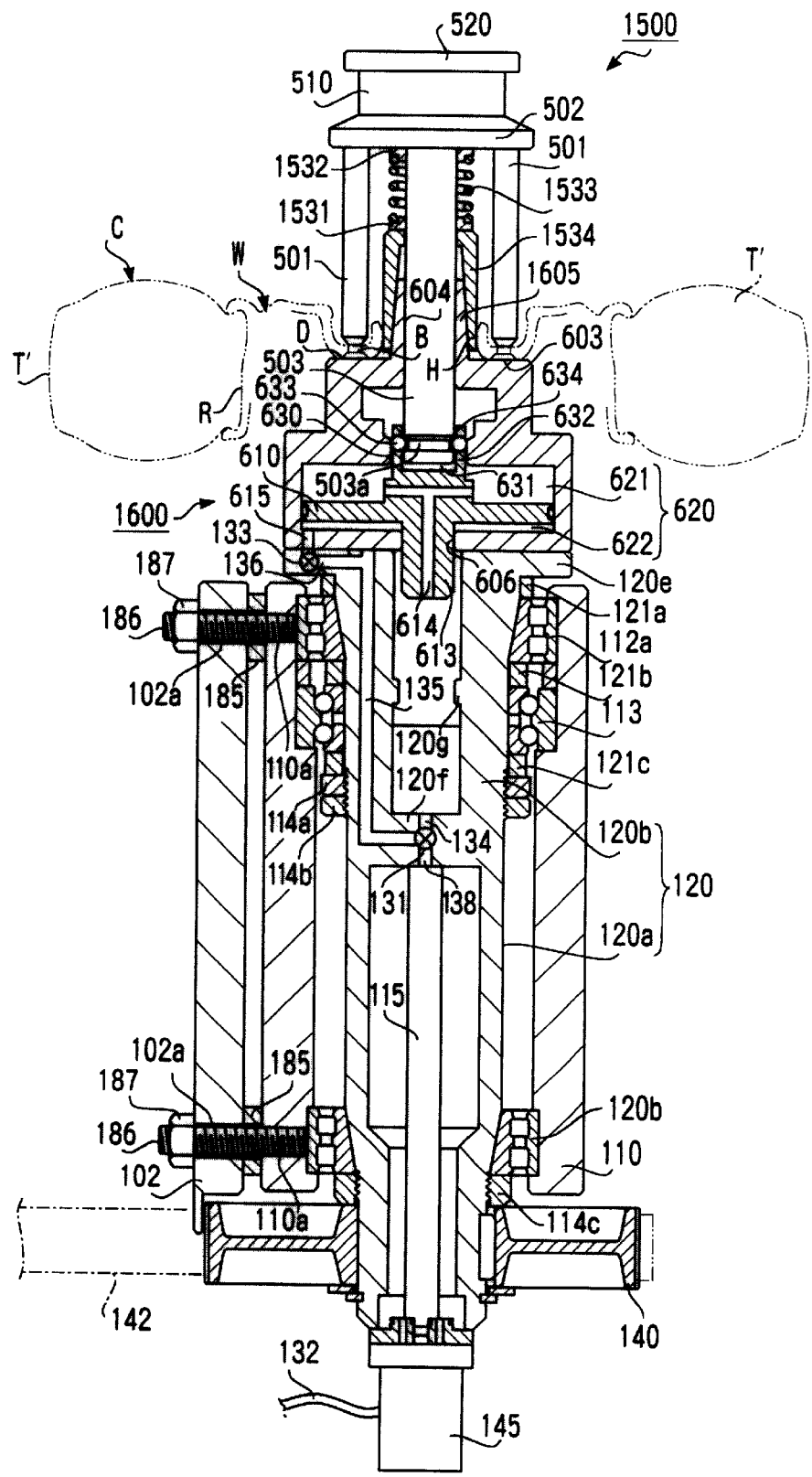
FIG. 12 is a cross-sectional side view of a spindle unit of the measuring apparatus shown in FIG. 11, wherein the wheeled tire is secured.

FIG. 12 shows the cross-sectional side view of the spindle unit 100 associated with the top adapter 1500 and the pulling cylinder unit 1600 of the measuring apparatus 1000. As shown in FIG. 12, a protruded portion 1605 of the pulling cylinder unit 1600 is cylindrically and upwardly protruded around the shaft insertion hole 604. The outer surface of the protruded portion 1605 is tapered (i.e., the diameter is smaller at an upper portion). The diameter of the bottom portion of the protruded portion 1605 is slightly larger than the diameter of the hub hole H. The constitution of the other portion of the pulling cylinder unit 1600 is the same as that of the measuring apparatus 1 of the first embodiment, and therefore, its description will be omitted.

The top adapter 1500 of this embodiment is different from the first embodiment in that it includes a spring-supported collet member 1534. The collet member 1534 is a cylindrically-shaped member and the outer diameter thereof is slightly smaller than the diameter of the hub hole H. The inner surface of the collet member is tapered and narrower upwardly (i.e., the diameter is smaller at an upper portion). The taper angle of the inner surface of the collet member 1534 is substantially the same as the taper angle of the outer surface of the protruded portion 1605. The insertion shaft 503 is inserted in an upper spring guide 1532, a coil spring 1533, a lower spring guide 1531 and the collet member 1534 in this order.

Both the two spring guides 1532 and 1531 are ring shaped members, and a step is formed on the outer surface of each spring guide. The diameter of the narrower portion of each of spring guides is the same as the inner diameter of the coil spring 1533. The narrower portions of the two spring guides are inserted in and fixed to the coil spring 1533, respectively. The insertion shaft 503 can be slidably inserted in the both of the spring guides. It should be noted that the collet is positioned coaxially with the spindle 120.

The upper end of the upper spring guide 1532 is fixed to the bottom face of the circular disk portion 502. The lower end of the lower spring guide 1531 is fixed to the upper end 1534a of the collet member 1534. Therefore the collet member 1534 and the lower spring guide 1531 are slidable along the insertion shaft 503.

Figure 13:
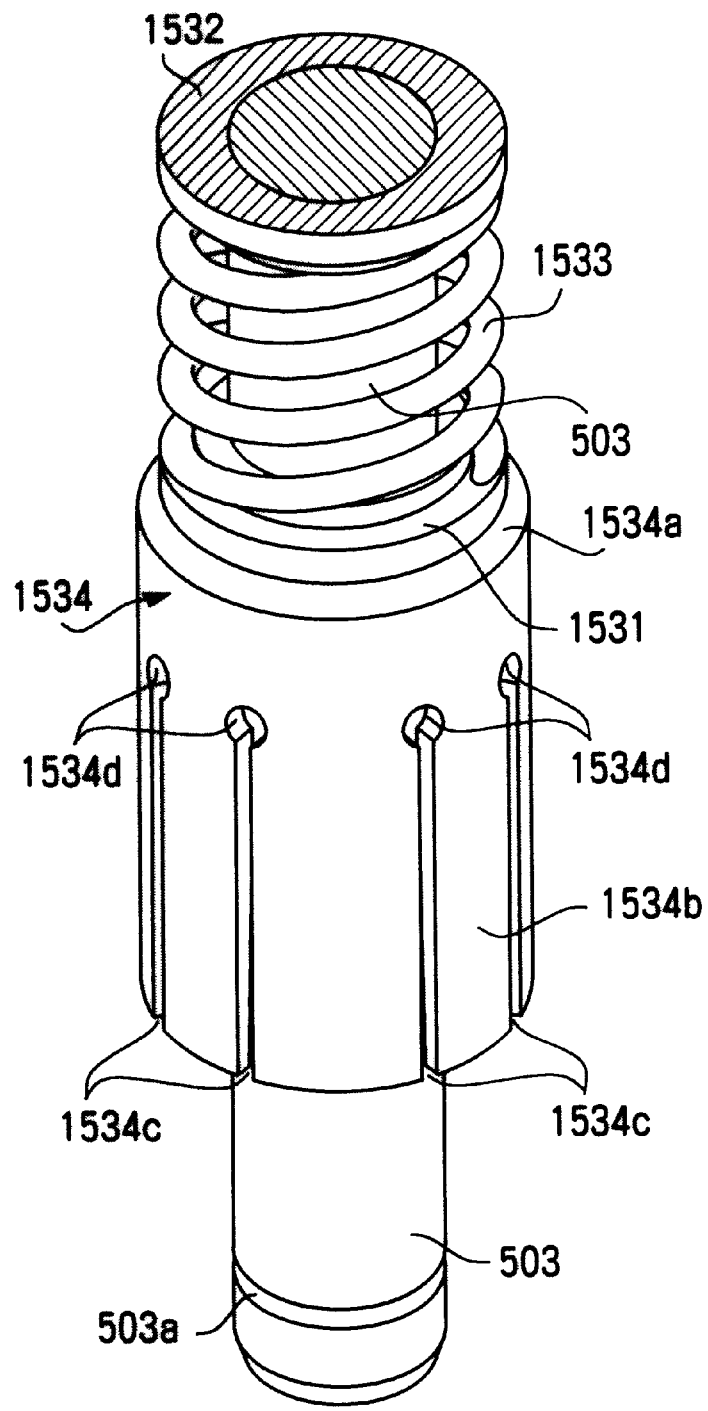
FIG. 13 shows a part of a top adapter including a collet portion of the third embodiment.

FIG. 13 shows an enlarged view of a part of the top adapter 1500. As shown in FIG. 13, a plurality of slits 1534c are formed on the circumferential surface 1534b of the collet member 1534. The slits 1534c extend in the axial direction of the spindle 120, from the intermediate parts of the circumferential surface 1534b toward the bottom end of the collet member 1534. The inner surface of the collet member 1534 contacts the tapered surface of the protruded portion 1605 when the inserter shaft 503 is inserted in the pulling cylinder unit 1600. By further pulling the inserter shaft 503 in the pulling cylinder unit 1600, the slits 1534c are opened and the outer diameter of the collet member 1534 increases. In this embodiment, the outer diameter of the bottom end of the collet member can be increased up to the diameter larger than the diameter of the hub hole. Therefore, as shown in FIG. 12, the circumferential surface of the collet member 1534 can tightly contacts the hub hole H of the wheeled tire C and the wheeled tire C can be coaxially secured to the rotation axis of the spindle 120.

It is noted that a hole 1534d is formed in the radial direction of the collet member 1534 at the upper end of each of the slits 1534c. The hole is configured to have a larger diameter than the width of the slit 1534c. The hole 1534d prevents stress concentrations caused at the upper ends of the slits 1534c while the slits 1534c are opened.

It should be noted that the measuring apparatus can include a top adapter changing member. The top adapter changing member can select a top adapter from a plurality of selectable top adapters. The diameter of the collet member 1534 and the number of pins 501 are set depending upon the diameter of the hub hole H and the number of the bolt hole B of each of the measurable tires. That is, the apparatus 1000 can secure any of the measurable tire by using the top adapter changing member to select a selectable top adapter suitable for the tire to be secured.

It should be noted that the scope of the invention is not limited to these embodiments described above. For instance, it is also possible to measure the high-speed uniformity measurement according to the present invention.

FIG. 14 shows a front view of the measuring apparatus 2000 in accordance with the third embodiment of the present invention. The measuring apparatus 2000 differs from the measuring apparatus 1 of the first embodiment in that triaxial piezoelectric sensors are employed instead of the piezoelectric force sensors 185. In this embodiment, the triaxial piezoelectric force sensors are used for measuring both the uniformity and dynamic balance measurements, and no load cell is mounted in the load wheel. Also, in this embodiment, the spindle 120 is driven by the rotary drum 30 during measurement of the uniformity, and the spindle 120 is driven using the pulley 140 during the measurement of the dynamic balance. For this purpose, the endless belt is constituted to be released during the uniformity measurement. Constitutions of the other portions of the apparatus 2000 are the same as the measuring apparatus 1 of the first embodiment, and therefore, its description will be omitted.

In the embodiment, a motor 2130 is mounted on rails (not shown) extending in a direction in which the motor 2130 approaches and leaves away from the spindle unit 2100. The motor 2130 is driven by a rack-and-pinion mechanism (not shown) to approach and leave away from the spindle unit 2100. A driving pulley 2144 is installed to the driving shaft of the motor 2130. An endless belt 2142 is passed around the driving pulley 2144 and two driven pulleys 2143 (one of two is shown in FIG. 14). The driven pulleys 2143 are capable of approaching and leaving away from the spindle unit 2100 in association with the motion of the motor 2130.

Figure 15:
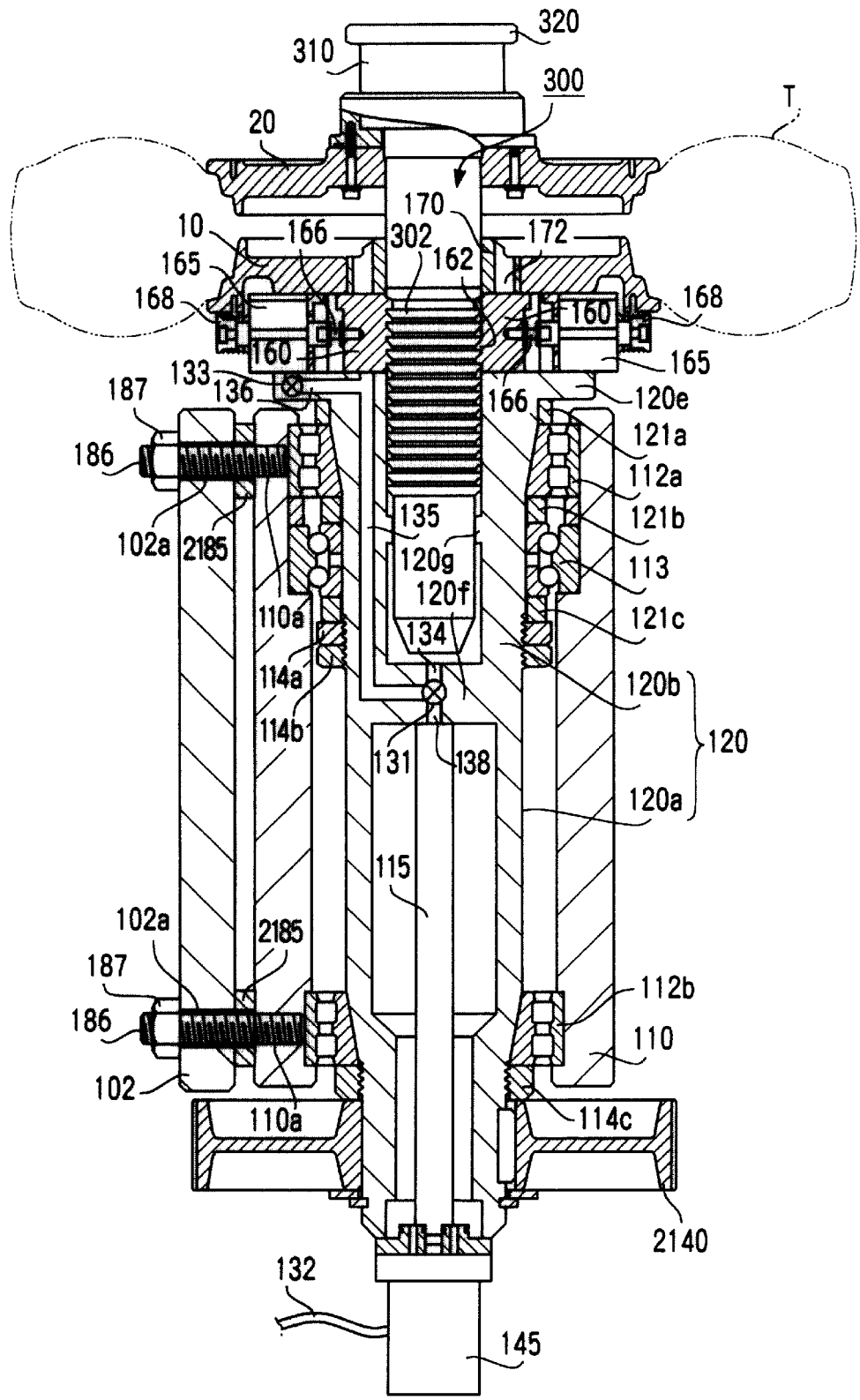
FIG. 15 is a cross-sectional side view of a spindle unit of the measuring apparatus shown in FIG. 14.

FIG. 15 shows the cross-sectional side view of the spindle unit 2100 of the measuring apparatus 2000. The triaxial piezoelectric force sensors 2185 are secured between the sensor fixing plate 102 and the an outer surface of the spindle housing 2100 similarly to the piezoelectric force sensors 185 of the first embodiment. No endless belt is passed around the pulley 2140.

Each of the triaxial piezoelectric force sensors 2185 is attached for detecting three components of received force. First component is a force component in the axial direction of the spindle 120. Second component is a force component in the radial direction of the spindle 120. Third component is a force component in the direction perpendicular to both of the directions of the above-indented components.

The first, second, and third components are used for measuring lateral, radial, and tractive force variation, respectively.

The measurement range of the second component is from 0 to 20000 kgf, and the ranges of other two components are from −2000 to 2000 kgf.

A procedure for measuring uniformity and dynamic balance using the measuring apparatus 2000 will be described hereinafter with reference to FIG. 16. In the procedure, uniformity measurement according to JASO C607 standard, high-speed uniformity measurement and dynamic balance measurement are continuously measured in this order.

Before the tire T is mounted, as illustrated by solid lines in FIG. 16, the motor 2130 associated with three pulleys has been moved toward the spindle unit 2100 and the outer surface of the endless belt 2142 has engaged the pulley 2140 that is attached to the spindle 120. On the other hand, the rotary drum 30 has moved away from the tire T as illustrated by solid lines in FIG. 16. The frictional force working between the endless belt 2142 and the pulley 140 prevents free rotation of the spindle.

Then, the tested tire T is mounted between the lower and upper rims 10 and 20, as in the first embodiment. Then the motor 2130 associated with the pulleys is moved away from the spindle unit 2100 as indicated by dotted lines in FIG. 16. Then, the rotary drum 30 is moved to approach to press the tire T using the rack and pinion mechanism 35 as indicated by dotted lines in FIG. 16. Then the rotary drum rotates the spindle at 60 r.p.m. and the force variations are detected by the triaxial piezoelectric force sensors 2185. The method for calculating the uniformity based on the detected force is well known, and therefore, its description is omitted.

Next, the high-speed uniformity is measured. The number of the revolutions (i.e., the rotation speed) of the spindle 120 is increased. The increased speed, for instance, may be 1238.5 r.p.m. which is equivalent to 140 kilometer/hour of circumferential speed of the tire given that the tire T is for a standard passenger car and its diameter is 600 mm. The force variations are detected by the triaxial piezoelectric force sensors 2185. The method for calculating the uniformity based on the detected force is well known, and therefore its description is omitted. It should be noted that the motor 1130 drives the endless belt 2142 and its speed is controlled to be the same speed as the circumferential speed of the tire.

Next, the dynamic balance is measured. The rotary drum 30 moves away from the tire T then the motor 2130 approaches the spindle unit 100 and the endless belt engages the pulley 2140. The motions of the rotary drum 30 and the motor 2130 are so quick that the tire is driven by the endless belt 2142 quickly and the revolution of the tire is decreased a little. The centrifugal force caused in the tested tire T is measured by the piezoelectric force sensors 2185 and the control unit (not shown) calculates the eccentricity of the tire T based on the measured centrifugal force. The method for calculating the dynamic balance based on the measured centrifugal force is well known, and therefore its description is omitted.

The control unit determines at which portion of the tire T a balance weight is to be placed, based on the result of the calculation of the dynamic balance, and the measuring apparatus 2000 uses a marking device (not shown) to mark this portion. The control unit further calculates which portion of the tire T should be cut away, based on the result of the calculation of the uniformity, and the measuring apparatus 2000 uses a cutting device (not shown) to cut the portion.

It should be noted that the tested tire T is to be rotated at its circumferential speed of 140 kilometer/hour, however the scope of the present invention is not limited to the above configuration. That is, for instance, a tire having 600 mm diameter can be rotated at a speed of 3000 r.p.m. which is equivalent to 340 kilometer/hour of its circumferential speed.

In this embodiment, the tested tire is a wheelless tire, however, the uniformity and the dynamic balance of a wheeled tire can also be measured. For this purpose, top adapter and the pulling cylinder unit, which are shown in the first embodiment, can be used instead of the lower and upper rims 10 and 20, the lock shaft 300, the hollow shaft 170, the lock member 160 and the locking cylinder 165 of this embodiment.

It should be noted that the scope of the invention is not limited to these embodiments described above. For instance, the spindle can be driven by the rotary drum during the dynamic balance measurement.

FIG. 17 shows a front view of the measuring apparatus 3000 in accordance with the fourth embodiment of the present invention. The measuring apparatus 3000 differs from the measuring apparatus 1 of the first embodiment in that the triaxial piezoelectric force sensors are used for measuring both the uniformity and dynamic balance, as in the third embodiment. Furthermore, in this embodiment, the spindle 120 can be driven by a driving pulley which contacts the pulley attached to the spindle when the rotary drum 3030 is retracted from the tested tire C. As shown in FIG. 17, the measuring apparatus 3000 is for measuring uniformity and/or dynamic balance of the wheeled tire. The wheeled tire C can be mounted as in the measuring apparatus 1 of the first embodiment, and therefore, its description will be omitted.

FIG. 18 is a cross-sectional side view of a spindle unit of the measuring apparatus shown in FIG. 17. As shown in FIG. 18, a pulley 3140 for rotationally driving the spindle 120 is mounted at the lower end of the spindle 120 when the rotary drum 3030 is retracted from the tested tire C. As shown in FIG. 17, a cylinder member 3143 is attached to the base 50 of the apparatus 3000. The driving axis of the cylinder member 3143 extends horizontally. One end of the cylinder member 3143 is fixed to the base 50 and the other end thereof is fixed to a driving motor 3142. The driving shaft of the driving motor 3142 extends upwardly therefrom, and a driving pulley 3144 is attached to the driving shaft. The driving pulley 3144 and the pulley 3140 attached to the spindle 120 are arranged horizontally. The cylinder member 3143 can be driven by a driving member (not shown) so that the cylinder member can be driven in the radial direction of the spindle 120. Therefore the driving pulley 3144 can be driven so as to contact and/or moves away from the pulley 3140. The motor 3142 is capable of rotating the spindle 120 associated with the pulley 3140 via the driving pulley 3144 when the pulley 3144 contacts the circumferential surface of the pulley 3140. It should be noted that the motor 3142 includes a brake member for preventing the rotation of the driving pulley 3144.

The procedure for measuring dynamic balance, high-speed uniformity and/or uniformity according to JASO C607 standard will be described hereinafter referring to FIG. 19 to FIG. 21.

FIG. 19 is a time chart illustrating the variation of the number of the revolutions (i.e., the rotation speed) of the tire C, according to this procedure for measurement. By this procedure, dynamic balance, high-speed uniformity and uniformity according to JASO C607 standard will be measured in this order. The measurement is controlled by a computer (not shown) of the measuring apparatus 3000.

First, the cylinder member 3143 is driven so that the driving pulley 3144 contacts the pulley 3140 attached to the spindle 120, and the brake member of the motor 3142 is actuated to prevent the rotation of the driving pulley 3144. Then the wheeled tire C is mounted and held on the spindle 120.

Then, the rotary drum 3030 is contacted to the tire C using the rack and pinion mechanism. Then, the rotary drum 3030 presses the tire C at 150 kgf (at step S101 (0 second) in FIG. 19). Next, the rotary drum starts rotating so that the tire C starts rotating, and the rotational speed of the tire C is accelerated to 1000 r.p.m. (at step S102 (0–2 second) in FIG. 19). Then, the load of the rotary drum for pressing the tire is increased to 50 kgf (at step S103 in FIG. 19).

In this embodiment, it costs 2 seconds to accelerate the rotational speed of the tire C to 1000 r.p.m. after the rotary drum starts rotating. It costs 1 second till the rotary drum pressing the tire C at 50 kgf since the tire C was accelerated to the 1000 r.p.m. Thus, the tire is rotated by 30 revolutions or more with horizontally pressed at 50–150 kgf. Even if the tire C is mounted diagonally, the tire C become secured correctly by pressing all part of the circumferential surface of the tire C 10 or more times.

Next, force variation is detected by the triaxial piezoelectric force sensors 2185 (step S104 (3–6 seconds) in FIG. 19). For measuring the dynamic balance, the force component in a horizontal direction is measured. In this embodiment, the third component which the triaxial force sensor can detect is used so that the detected force component does not include the pressing force by the rotary drum 30. Therefore the third component includes only the centrifugal force caused in the tire C. The control unit (not shown) calculates the eccentricity of the tire T based on the measured centrifugal force. The method for calculating the dynamic balance based on the measured centrifugal force is well known, and accordingly, its description is omitted.

Then, the high-speed uniformity will be measured by increasing the pressing force to 500 kgf (step S105 (6–11 seconds) shown in FIG. 19). The rotational speed of the tire C is unchanged since the dynamic balance is measured. The radial, lateral and tractive force variations are detected by the triaxial force sensors 2185. The method for calculating the uniformity based on the detected force variations is well known, and therefore, its description is omitted.

Next, the uniformity according to JASO 607 standard will be measured. The rotational speed of the rotary drum is decreased in order to rotate the tire C at 60 r.p.m. (step S106 (11–14 seconds) shown in FIG. 19). Then, the radial, lateral and tractive force variations are detected by the triaxial force sensors 2185 (step S107 (14–17 seconds) shown in FIG. 19). The method for calculating the uniformity based on the detected force variations is well known, and therefore, its description is omitted.

Next, the rotation of the rotary drum C associated with the tire C is stopped temporarily, and re-rotated reversely. The rotational speed of the tire is increased to 60 r.p.m. (step S108 (17–18 seconds) in FIG. 19). It is noted that the state of the apparatus 2000 such as state of lubrications of the bearings can be unstable when the tire starts to be reversely rotated. Therefore then the rotational speed of the tire C is maintained to 60 r.p.m. until the state of the apparatus become stable(step S109 (18–20 seconds) shown in FIG. 19). Then radial, lateral and tractive force variations are detected by the triaxial force sensor 2185 (step S110 (20–23 seconds) shown in FIG. 19). Then the uniformity based on the detected force variations is calculated. Then, the rotational speed of the tire is decreased (step S111 (23–24 second) shown in FIG. 19) and the rotation of the rotary drum C is terminated (step S112 (at 24 second) shown in FIG. 19).

The control unit determines at which portion of the tire C a balance weight is to be placed, based on the result of the calculation of the dynamic balance, and the measuring apparatus 3000 uses a marking device (not shown) to mark this portion. The control unit further calculates which portion of the tire C should be cut away, based on the result of the calculation of the uniformity, and the measuring apparatus 3000 uses a cutting device (not shown) to cut this portion.

It should be noted that the dynamic balance, high-speed uniformity and uniformity according to JASO C607 standard are continuously measured by the above-mentioned procedure. However the present invention is not limited to the above-described series of procedures. For instance, steps S107–S111 shown in FIG. 19 may be omitted and only the high-speed uniformity and the dynamic balance may be measured.

The procedure for measuring the dynamic balance and the high-speed uniformity will be described hereinafter referring to FIG. 20.

FIG. 20 is a time chart illustrating the variation of the number of the revolution (i.e., the rotation speed) of the tire C, according to this procedure for measurement. By this procedure, the dynamic balance and high-speed uniformity will be measured in this order. The measurements are controlled by a computer (not shown) of the measuring apparatus 3000.

First, the cylinder member 3143 is driven so that the driving pulley 3144 contacts the pulley 3140 attached to the spindle 120, and the brake member of the motor 3142 is controlled to prevent the rotation of the driving pulley 3144. Then the wheeled tire C is mounted and held on the spindle 120.

Then, the rotary drum 3030 is made contact the tire C using the rack and pinion mechanism. Then, the rotary drum 30 is press-contacted with the tire C at 150 kgf (step S201 (0 second) in FIG. 20). Next, the rotary drum 3030 starts rotating (so the tire C starats rotating, too) and the rotational speed of the tire C is accelerated to 1000 r.p.m. (step S202 (at 0–2 seconds) in FIG. 20). Then, the load of the rotary drum for pressing the tire is increased to 50 kgf (step S203 in FIG. 20).

Next, force variation is detected by the triaxial piezoelectric force sensors 2185 (step S204 (at 3–6 seconds) in FIG. 20). For measuring the dynamic balance, the force component in a horizontal direction is measured. In this embodiment, the third component which the triaxial force sensor can detect is used so that the detected force component does not include the pressing force by the rotary drum 30. Therefore the third component includes only the centrifugal force caused in the tire C. The control unit (not shown) calculates the eccentricity of the tire T based on the measured centrifugal force. The method for calculating the dynamic balance based on the measured centrifugal force is well known, and accordingly, its description is omitted.

Then, the high-speed uniformity will be measured by increasing the pressing force to 500 kgf (step S205 (6–11 second) shown in FIG. 20). The rotational speed of the tire C is unchanged since the dynamic balance is measured. The radial, lateral and tractive force variations are detected by the triaxial force sensors 2185. The method for calculating the uniformity based on the detected force variations is well known, and therefore, its description is omitted.

Then, the rotational speed of the tire is decreased (step S206 (11–13 second) shown in FIG. 20) and the rotation of the rotary drum C is terminated (step S207 (at 13 second) shown in FIG. 20).

The control unit determines at which portion of the tire C a balance weight is to be placed, based on the result of the calculation of the dynamic balance, and the measuring apparatus 3000 uses a marking device (not shown) to mark this portion. The control unit further calculates which portion of the tire C should be cut away, based on the result of the calculation of the uniformity, and the measuring apparatus 3000 uses a cutting device (not shown) to cut this portion.

It should be noted that measuring dynamic balance and high-speed uniformity are continuously measured by above-mentioned procedure. However the present invention is not limited to the procedure. For instance, the uniformity according to JASO C607 standard may be measured instead of the high-speed uniformity.

The procedure for measuring the dynamic balance and the uniformity according to JASO C607 standard will be described hereinafter with reference to FIG. 21.

First, the cylinder member 3143 is driven so that the driving pulley 3144 contacts the pulley 3140 attached to the spindle 120, and the brake member of the motor 3142 prevents the rotation of the driving pulley 3144. Then the wheeled tire is mounted and held on the spindle 120.

Then, the rotary drum 30 is contacted with the tire C using the rack and pinion mechanism. Then, the rotary drum 3030 is press-contacted with the tire C at 150 kgf (step S301 (at 0 second) in FIG. 21). Next, the rotary drum starts rotating (so the tire C starts rotating, too) and the rotational speed of the tire C is accelerated to 1000 r.p.m. (step S302 (at 0–2 second) in FIG. 21). Then, the load of the rotary drum 3030 for pressing the tire is increased to 50 kgf (step S303 in FIG. 21).

Next, force variation is detected by the triaxial piezoelectric force sensors 2185 (step S304 (at 3–6 second) in FIG. 21). For measuring the dynamic balance, the force component in a horizontal direction is measured. In this embodiment, the third component which the triaxial force sensor can detect is used so that the detected force component does not include the pressing force by the rotary drum 30. Therefore the third component includes only the centrifugal force caused in the tire C. The control unit (not shown) calculates the eccentricity of the tire T based on the measured centrifugal force. The method for calculating the dynamic balance based on the measured centrifugal force is well known, and accordingly, its description is omitted.

Then, the uniformity according to JASO C607 standard will be measured. For this purpose, the pressing force is increased to 500 kgf and the rotational speed of the rotary drum is decreased in order to rotate the tire C at 60 r.p.m. (step S305 (at 6–9 seconds) shown in FIG. 21). Then the radial, lateral and tractive force variations are detected by the triaxial force sensors 2185 (step S306 (at 9–12 second) shown in FIG. 21). The method for calculating the uniformity based on the detected force variations is well known, and accordingly, its description is omitted.

Next, the rotation of the rotary drum 3030 associated with the tire C is stopped temporarily, and re-rotated reversely. The rotational speed of the tire C is increased to 60 r.p.m. (step S307 (at 12–13 seconds) shown in FIG. 21). As described above, the state of the apparatus 2000 can be unstable when the tire starts to be reversely rotated. Therefore then the rotational speed of the tire C is maintained at 60 r.p.m. until the state of the apparatus become stable (step S308 (at 13–15 seconds) shown in FIG. 21). Then the radial, lateral and tractive force variations are detected by the triaxial force sensors 2185 (step S309 (at 15–18 seconds) shown in FIG. 21). Then the uniformity based on the detected force variations is calculated. Then, the rotational speed of the tire is decreased (step S310 (at 18–19 seconds) shown in FIG. 21) and the rotation of the rotary drum C is terminated (step S311 (at 19 second) shown in FIG. 21).

The control unit determines at which portion of the tire C a balance weight is to be placed, based on the result of the calculation of the dynamic balance, and the measuring apparatus 3000 uses a marking device (not shown) to mark this portion. The control unit further calculates which portion of the tire C should be cut away, based on the result of the calculation of the uniformity, and the measuring apparatus 3000 uses a cutting device (not shown) to cut this portion.

In this embodiment, the tested tire is a wheeled tire, however, the uniformity and/or the dynamic balance of a wheelless tire can also be measured. For this purpose, the lower and upper rims, the lock shaft, the hollow shaft, the lock member and the locking cylinder, as shown in the first embodiment, can be used instead of the top adapter and the pulling cylinder unit of this embodiment.

The present disclosure relates to the subject matter contained in Japanese Patent Applications No. P2001-065812, filed on Mar. 8, 2001, No. P2001-153249, filed on May 22, 2001, No. P2001-153295, filed on May 23, 2001, No. P2001-153329, filed on May 23, 2001, and No. P2001-187405, filed on Jun. 20, 2001, which are expressly incorporated herein by reference in their entireties.

What is claimed is:

1. An apparatus for measuring uniformity and dynamic balance of a tire, comprising:
    a spindle rotatably supported in a rigidly-supported spindle housing, said tire being fixedly mounted on said spindle, said spindle being rotated when measurement is performed; and
    at least one piezoelectric force sensor mounted on a surface of said spindle housing, said at least one piezoelectric force sensor detecting a force generated by rotation of the tire as said spindle is rotated.

2. The apparatus according to claim 1, wherein said piezoelectric force sensor includes a triaxial piezoelectric force sensor.

3. The apparatus according to claim 2, wherein the tire is rotated by a rotary drum of said apparatus during the uniformity measurement.

4. The apparatus according to claim 2, wherein said tire and spindle are rotatably driven by said rotary drum to a first rotational speed during the dynamic balance measurement while being pressed by said rotary drum to a first load in a predetermined direction perpendicular to the rotational axis of said spindle,
    wherein the tire and said spindle are rotatably driven by said rotary drum to a second rotational speed during the uniformity measurement while being pressed by said rotary drum to a second load in the predetermined direction perpendicular to the rotational axis of said spindle,
    wherein said first pressing force is smaller than said first pressing force, and
    wherein said second rotational speed is within a range of 60–3300 r.p.m.

5. The apparatus according to claim 4, wherein said first pressing force is within a range of 20–100 kgf.

6. The method according to claim 5, wherein said first pressing force is within a range of 40–60 kgf.

7. The apparatus according to claim 4, wherein said second pressing force is within a range of 100–2000 kgf.

8. The record medium according to claim 4, wherein said first rotational speed is within a range of 750–1400 r.p.m.

9. An apparatus for measuring uniformity and/or dynamic balance of a tire, comprising:
    a spindle which is rotatably supported in a rigidly-supported spindle housing, said tire being fixedly mounted on said spindle; and
    at least one radial cylindrical bearing that rotatably supports said spindle in said spindle housing, said radial cylindrical bearing including at least a radial double-row cylindrical bearing.

10. The apparatus according to claim 9, wherein a part of a circumferential surface of said spindle on which said radial cylindrical bearing is to be attached is tapered;
    wherein an inner surface of said radial cylindrical bearing is tapered such that a cone angle of said inner surface is the same as a cone angle of the tapered part of the circumferential surface of said spindle; and
    said radial cylindrical bearing is attached to said spindle so that the inner surface of said radial cylindrical bearing tightly fits on said tapered part of the circumferential surface of said spindle.

11. An apparatus for measuring uniformity and/or dynamic balance of a tire, comprising:
    a spindle rotatably mounted in a spindle housing via at least one bearing, the tire being fixedly mounted on said spindle,
    wherein said spindle holds the tire between a lower rim attached to said spindle and an upper rim which is arranged oppositely with respect to the lower rim, said upper rim is movable upward and downward with respect to said spindle, said upper rim including a lock shaft downwardly extending from a rotation center of said upper rim, said lock shaft being capable of fitting to a fitting portion formed in said spindle.

12. The apparatus according to claim 11,
    wherein said spindle is rotatably supported in said spindle housing via a plurality of bearings; and
    wherein the fitting portion of said spindle is located at substantially a midpoint between two of said plurality of bearings.

13. An apparatus for measuring uniformity and/or dynamic balance of a tire, comprising:
    a spindle;
    a spindle housing rotatably supporting said spindle;
    a lower rim attached to said spindle and an upper rim arranged oppositely to said lower rim, said upper rim being movable upward and downward, and rotatable; and
    a lock member for holding said upper rim at a predetermined position,
    said apparatus being configured to measure uniformity and/or dynamic balance of the tire, by rotating said spindle with holding the tire using said upper and lower rims,
    wherein said upper rim includes a lock shaft downwardly extending from the rotation center of said upper rim, the lock shaft being engageable with said spindle, and
    wherein said lower rim includes:
        a lock shaft insertion cylinder in which said lock shaft can be inserted; and a lock member attaching hole formed on the circumferential surface of said lock shaft insertion cylinder, one end of said lock shaft insertion cylinder being fixed to one end of said spindle, said lock member being slidable in said lock member attaching hole in the radial direction of said lower rim, said lock member meshing with locking grooves formed on said lock shaft to lock said lock shaft, and wherein the length of said lock shaft insertion cylinder in the axial direction of said lower rim is 1–2 times as long as the length of said lock member attaching hole in the axial direction of said lower rim.

14. The apparatus according to claim 13, wherein the length of said lock shaft insertion cylinder in the axial direction of said lower rim is 1–1.5 times as long as the length of said lock member attaching hole in the axial direction of said lower rim.

15. An apparatus for measuring dynamic balance of a tire, comprising:

a rotatable spindle, the tire being fixedly mounted on said spindle, said spindle being rotatably supported in a rigidly-supported spindle housing, wherein a force generated by the rotation of the tire can be detected by a piezoelectric force sensor mounted on a surface of said spindle housing, the tire and said spindle being rotatably driven by a rotary drum which is press-contacted with the tire at a first pressing force in the predetermined direction which is perpendicular to the rotational axis of said spindle and rotating the tire.

16. The apparatus according to claim 15, wherein said first pressing force is within a range of 20–100 kgf.

17. The apparatus according to claim 16, wherein said first pressing force is within a range of 40–60 kgf.

18. The apparatus according to claim 17, wherein said piezoelectric force sensor is capable of detecting a force component in a direction perpendicular to both of said predetermined direction and the rotational axis of said spindle.

19. A method for measuring dynamic balance of a tire, comprising:

a tire mounting step for mounting the tire on a spindle of a dynamic balance measuring apparatus, the spindle being rotatably attached to a rigidly-supported spindle housing of the apparatus;

a first tire pressing step for pressing the tire in a predetermined direction perpendicular to the rotational axis of the spindle at a second pressing force with a rotary drum of the apparatus;

a rotary drum rotating step for rotatably driving the rotary drum;

a first rotary drum speed changing step for accelerating the rotation of the tire to a first rotational speed;

a second tire pressing step for changing the amount of the load for pressing the tire by the rotary drum into a first pressing force; and a first measurement step for detecting a force generated in the tire in the first measurement step by at least one piezoelectric force sensor fittingly mounted on the spindle housing, wherein the first pressing force is 1–10 times as large as the second pressing force.

20. The method according to claim 19, wherein the first pressing force is 2–4 times as large as the second pressing force.

21. The method according to claim 19, wherein the first rotational speed is within a range of 60–3300 r.p.m.

22. The method according to claim 21, wherein the first rotational speed is within a range of 750–1400 r.p.m.

23. A method for measuring dynamic balance and uniformity of a tire, comprising:

a tire mounting step for mounting the tire on a spindle of a dynamic balance measuring apparatus, the spindle being rotatably attached to a rigidly-supported spindle housing of the apparatus;

a first tire pressing step for pressing the tire to a second pressing force by a rotary drum of the apparatus, the rotary drum being capable of pressing the tire in the predetermined direction perpendicular to the rotational axis of the spindle and rotating the tire;

a rotary drum rotating step for rotatably driving the rotary drum;

a first rotary drum speed changing step for accelerating the rotation of the tire to a first rotational speed;

a second tire pressing step for changing the amount of the load for pressing the tire by the rotary drum into a first pressing force;

a first measurement step for detecting a force generated in the tire by at least one piezoelectric force sensor mounted on the spindle housing;

a third tire pressing step for changing the amount of the load for pressing the tire by the rotary drum into a third pressing load;

a second rotary drum speed changing step for changing the rotational speed of the tire into a second rotational speed; and a second measurement step for detecting a force generated in the tire by said piezoelectric force sensor.

24. The method according to claim 23, wherein said third pressing load is 100–2000 kgf.

25. The method according to claim 23, wherein said second rotational speed is 60 r.p.m.

* * * * *